United States Patent
Yoneyama et al.

(12) 
(10) Patent No.: US 6,876,612 B2
(45) Date of Patent: Apr. 5, 2005

(54) INFORMATION RECORDING APPARATUS AND METHOD

(75) Inventors: Kazuto Yoneyama, Tokyo (JP); Junji Shiokawa, Tokyo (JP); Keiji Nagayama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 510 days.

(21) Appl. No.: 10/029,664

(22) Filed: Dec. 21, 2001

(65) Prior Publication Data

US 2003/0081525 A1 May 1, 2003

(30) Foreign Application Priority Data

Oct. 25, 2001 (JP) ........................................ 2001-327114

(51) Int. Cl.[7] .............................................. G11B 5/09
(52) U.S. Cl. ............................... 369/47.55; 369/30.04; 369/53.37; 369/124.07
(58) Field of Search ........................... 369/30.04, 30.24, 369/30.25, 30.36, 47.55, 53.2, 53.24, 53.37, 53.45, 124.07

(56) References Cited

U.S. PATENT DOCUMENTS 6,345,017 B1 * 2/2002 Inoue ...................... 369/30.24

FOREIGN PATENT DOCUMENTS

| JP | 08-273304 | 10/1996 |
|---|---|---|
| JP | 2001-148168 | 5/2001 |

* cited by examiner

Primary Examiner—Paul W. Huber
(74) Attorney, Agent, or Firm—Townsend and Townsend and Crew LLP

(57) ABSTRACT

The present invention provides simple finalizing that is quicker to be done. To ensure that the finalized recording medium can be replayed by any type of playback apparatus, the invention includes means for additional finalizing that makes the medium the same as processed by normal finalizing.

15 Claims, 17 Drawing Sheets

FIG.2
BEFORE FINALIZING
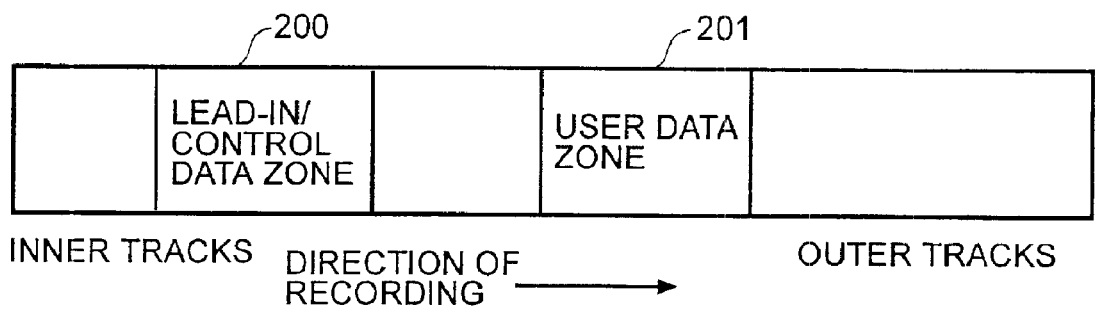
AFTER FINALIZING
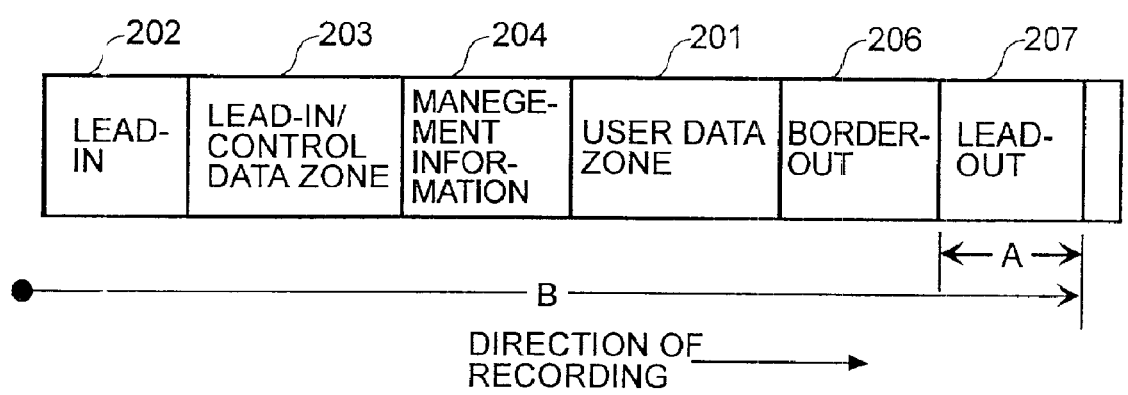

FIG.3
BEFORE FINALIZING
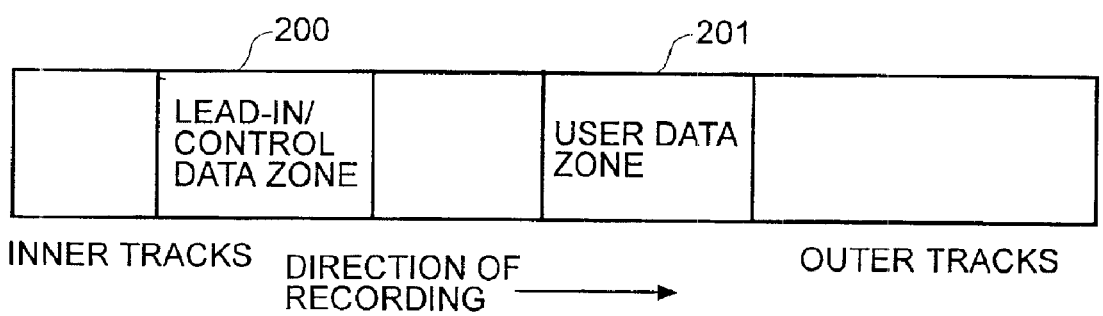
INNER TRACKS    DIRECTION OF RECORDING →    OUTER TRACKS
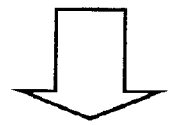
AFTER SIMPLE FINALIZING
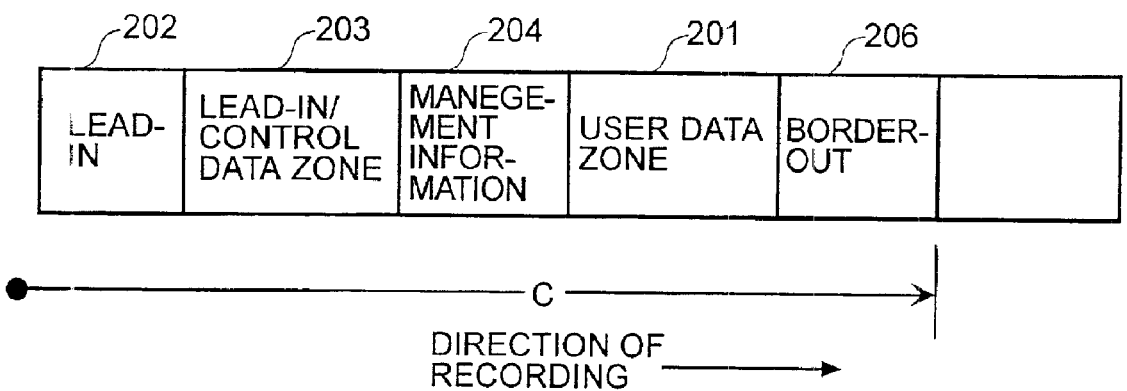
DIRECTION OF RECORDING →

FIG.6
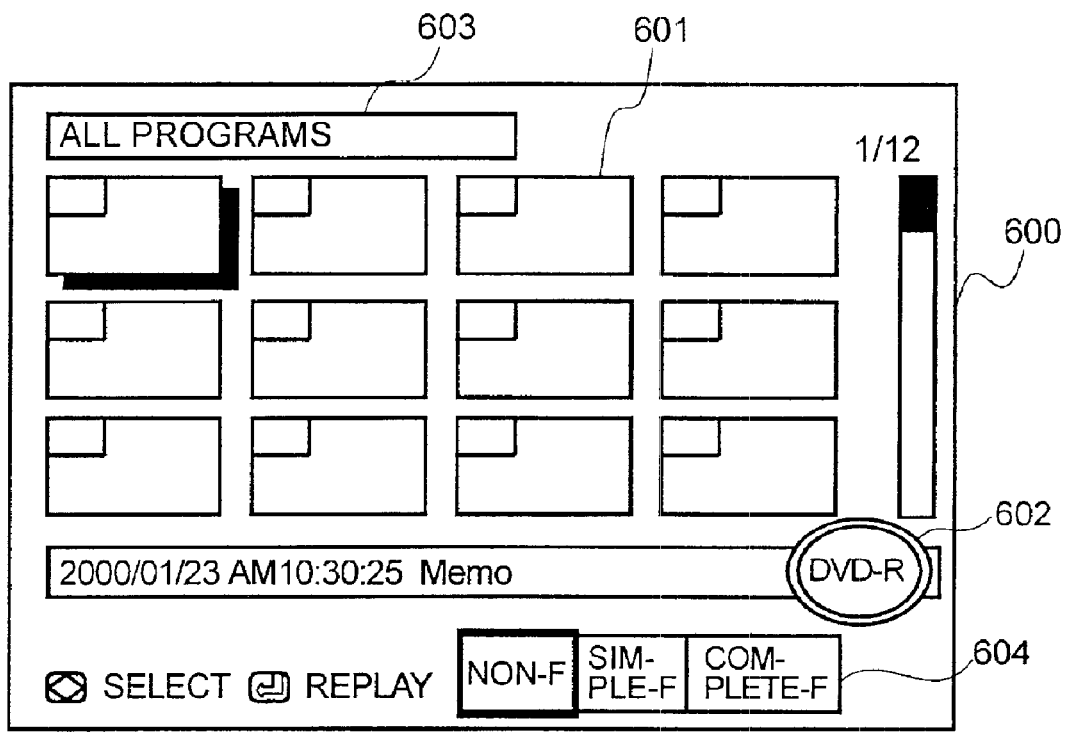
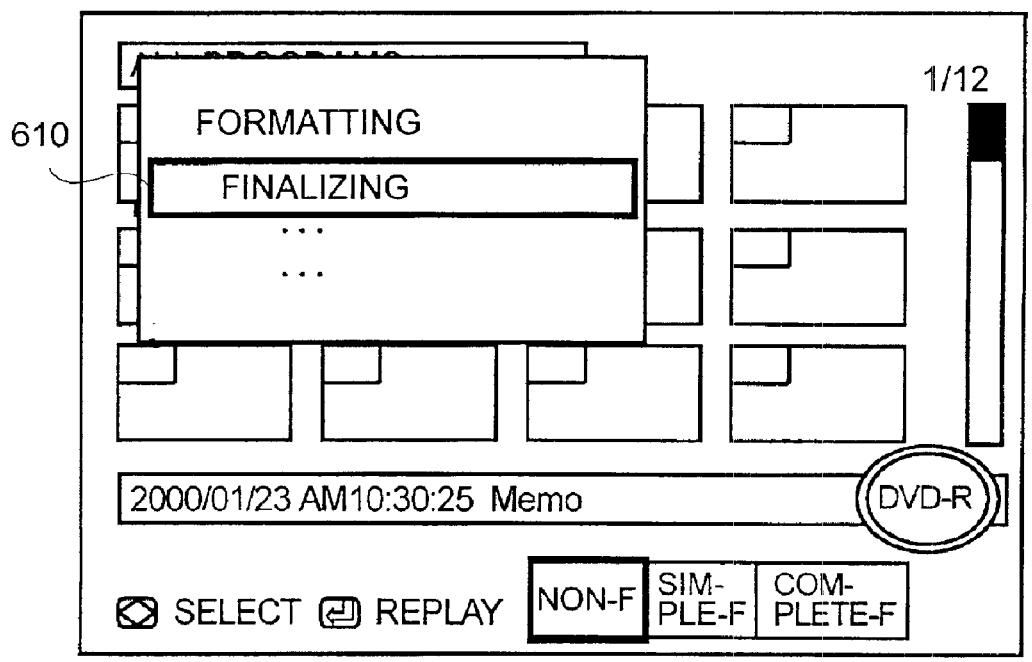

FIG.7
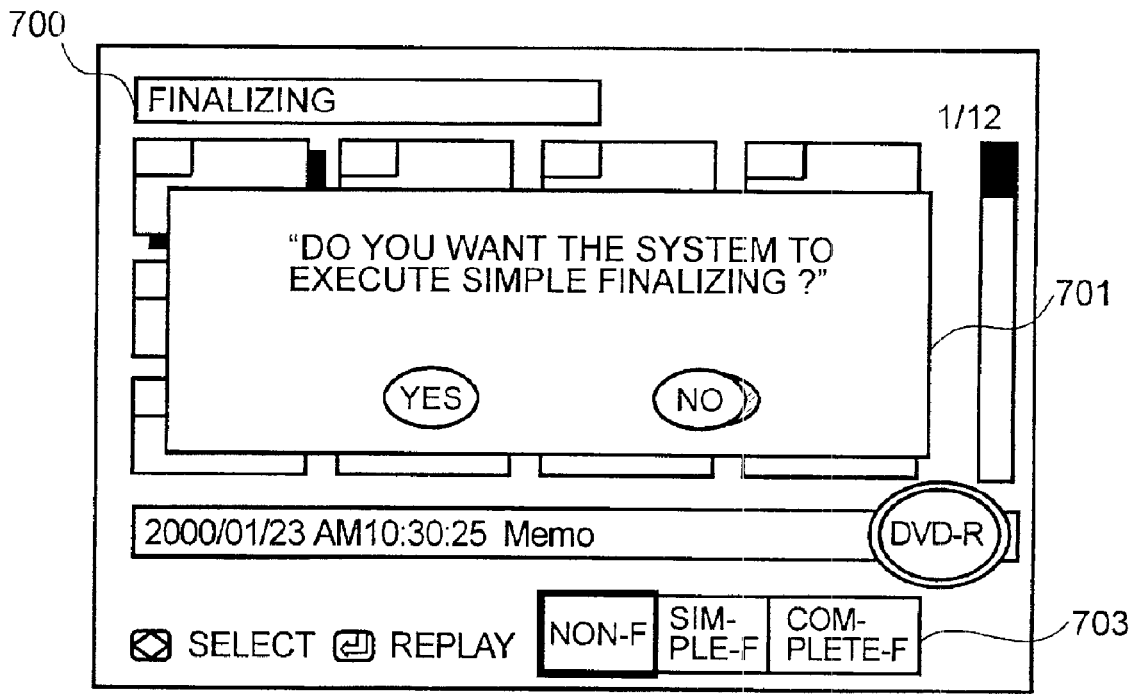
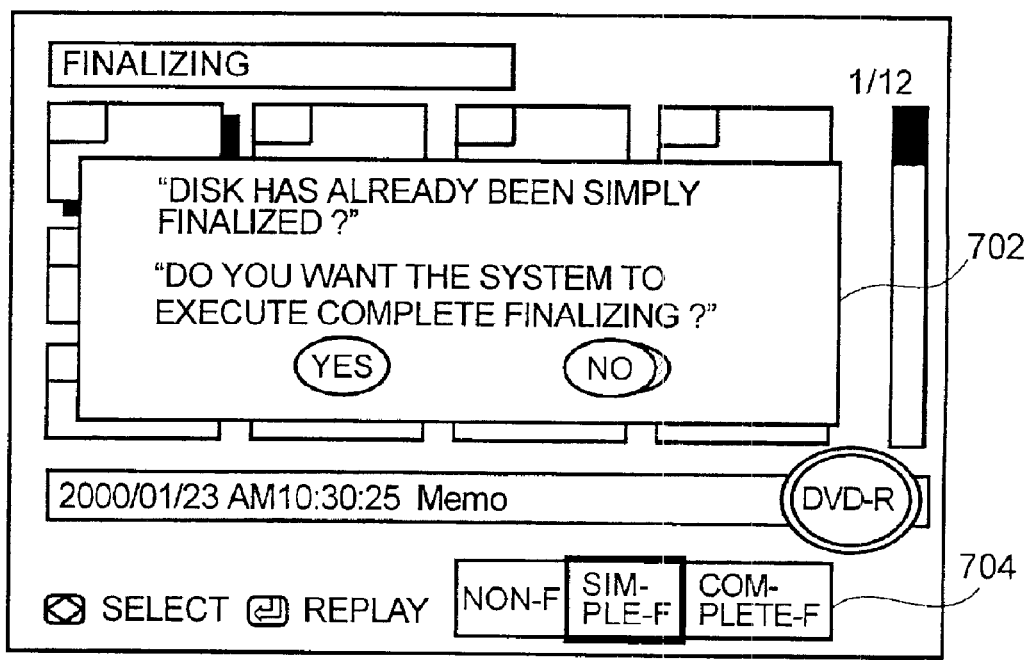

FIG.10
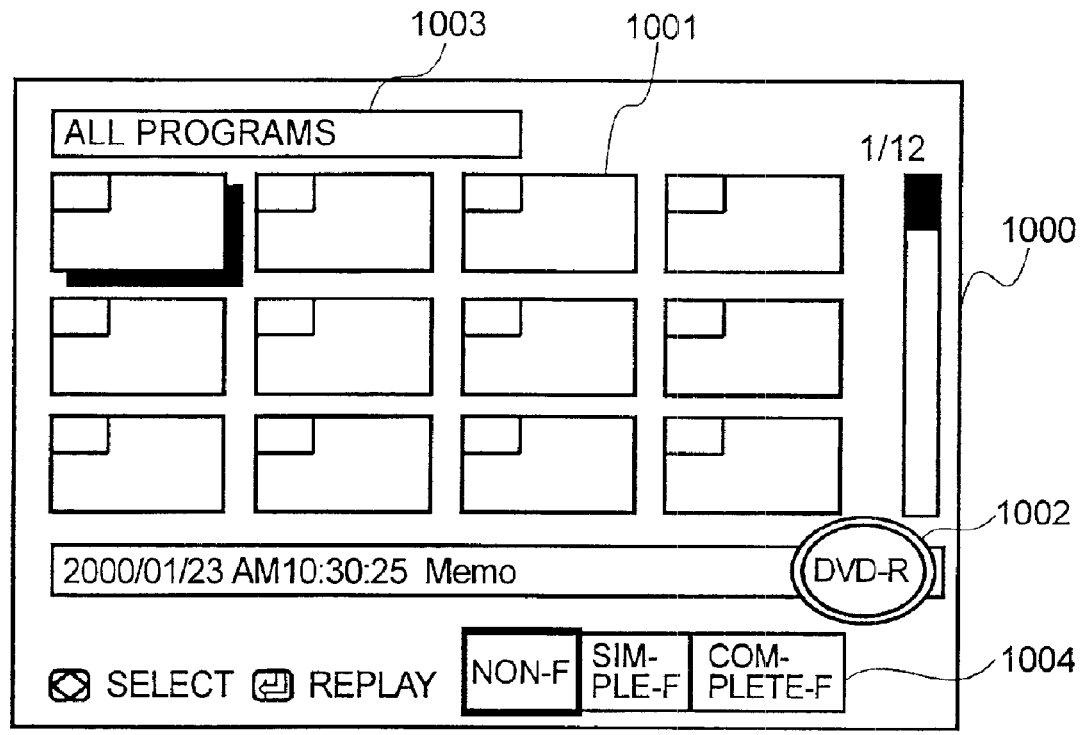
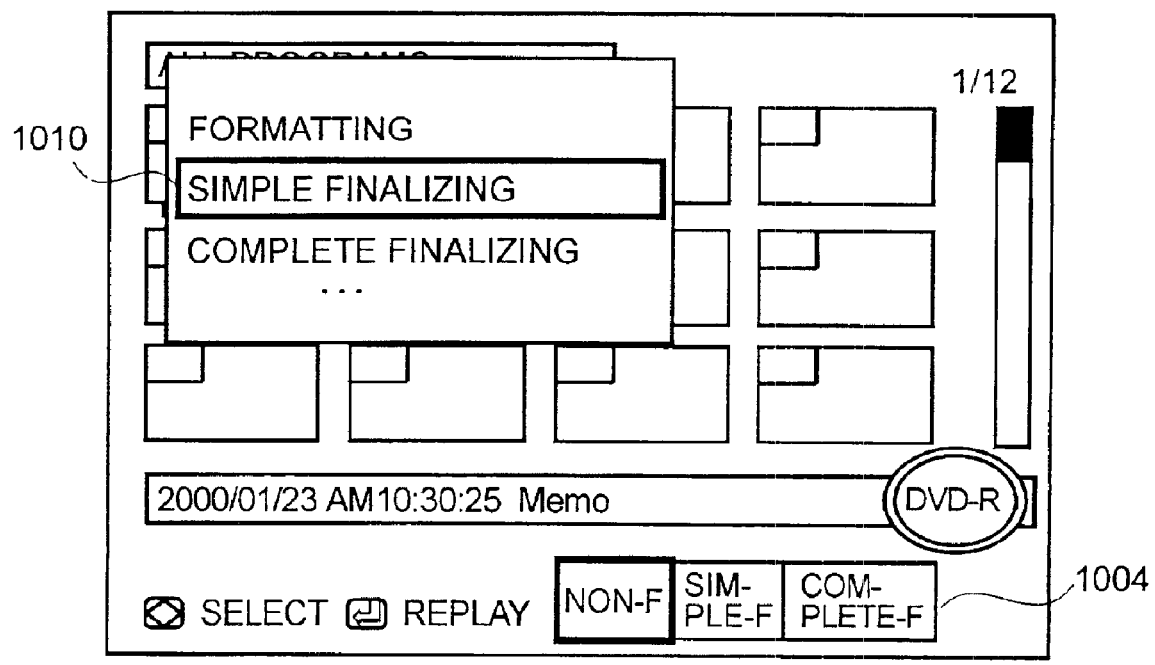

FIG.11
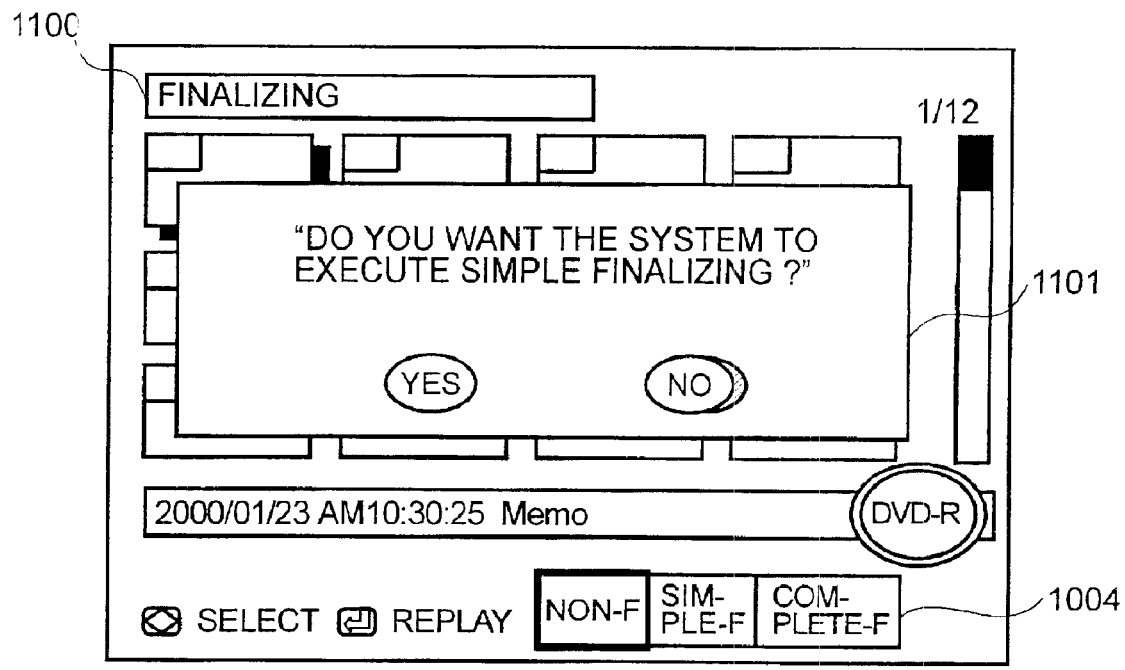
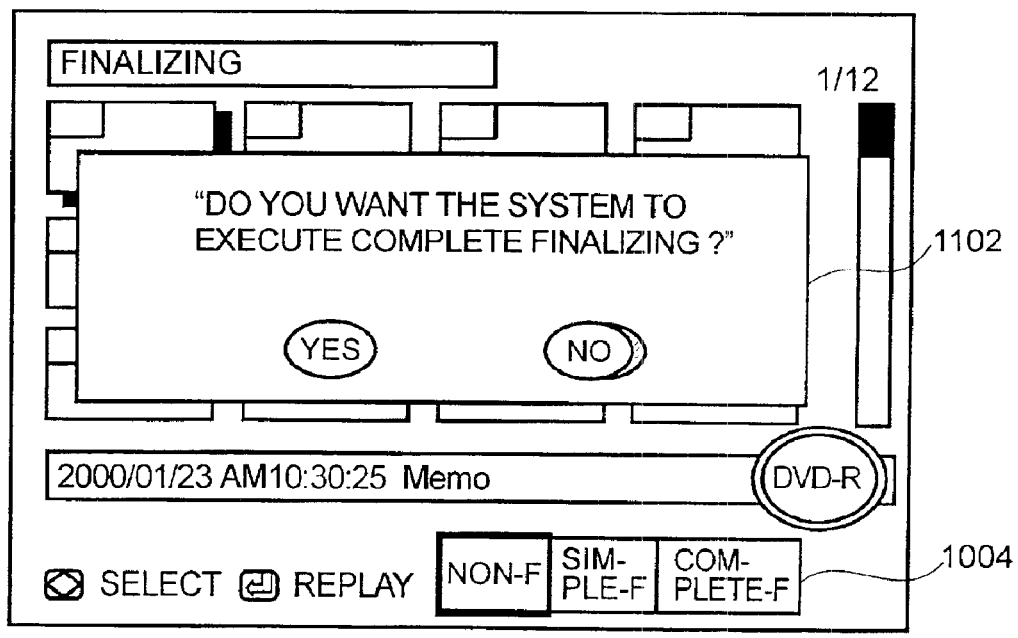

FIG.16
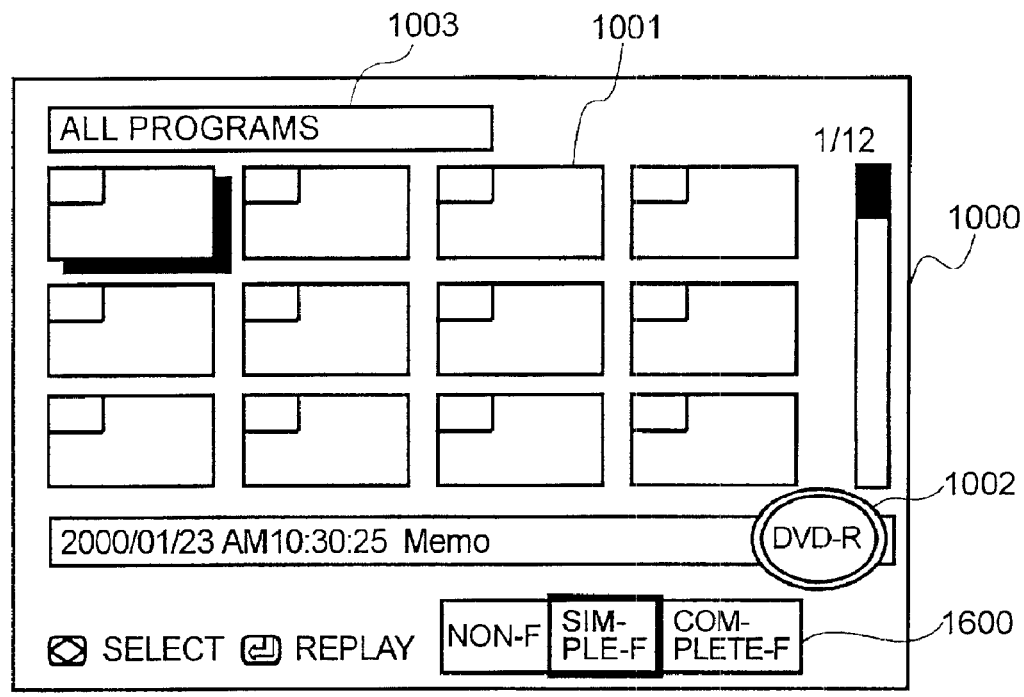
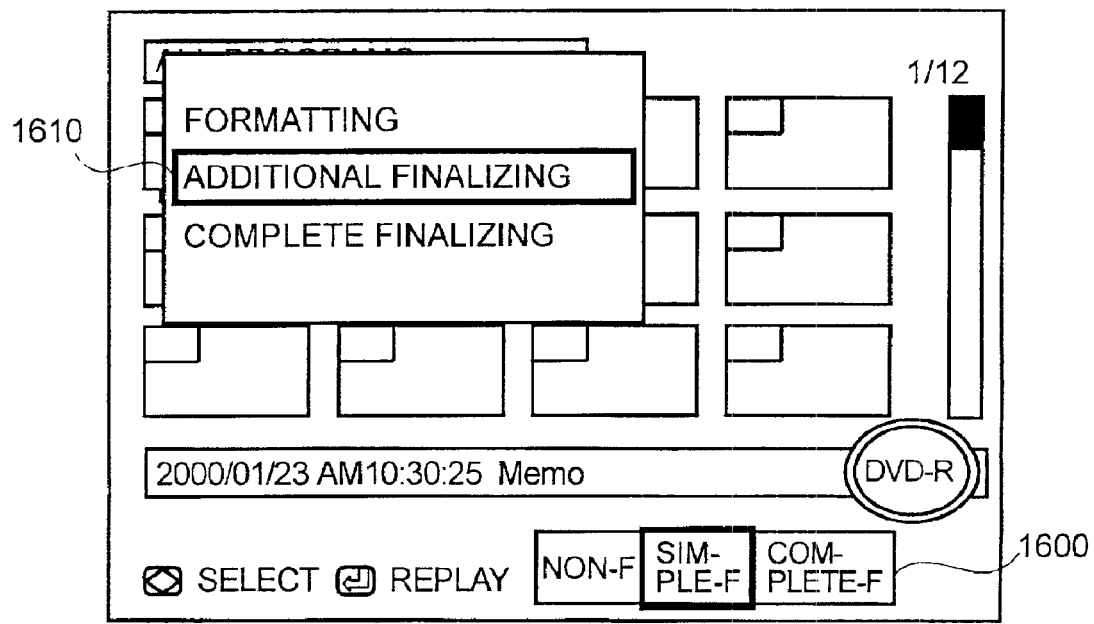

FIG.17
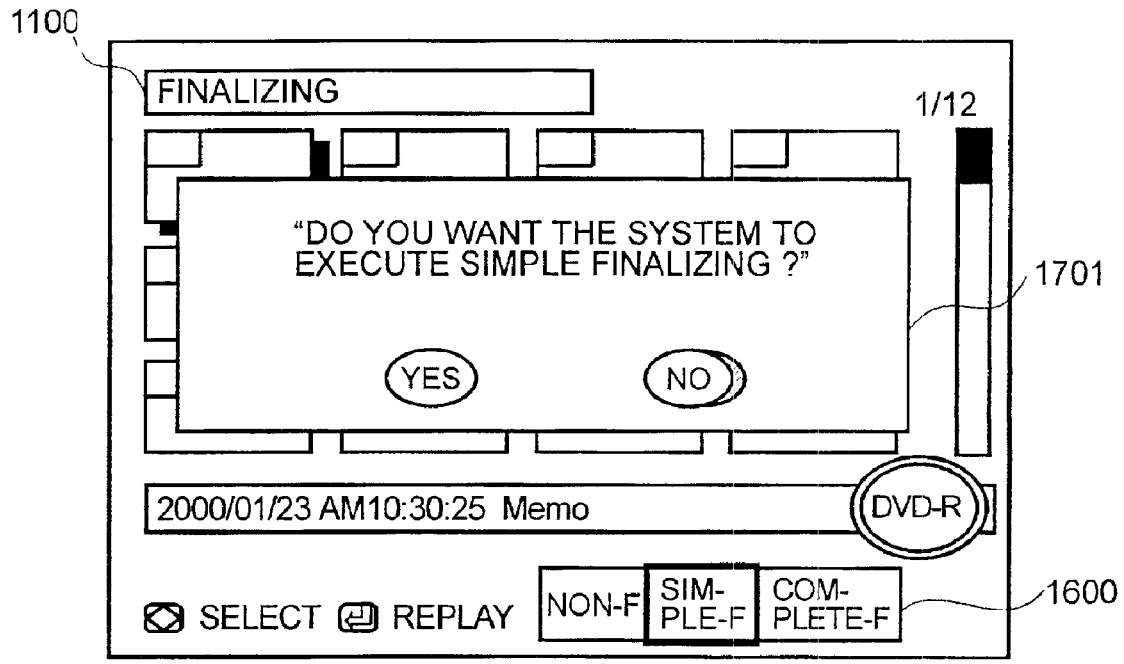
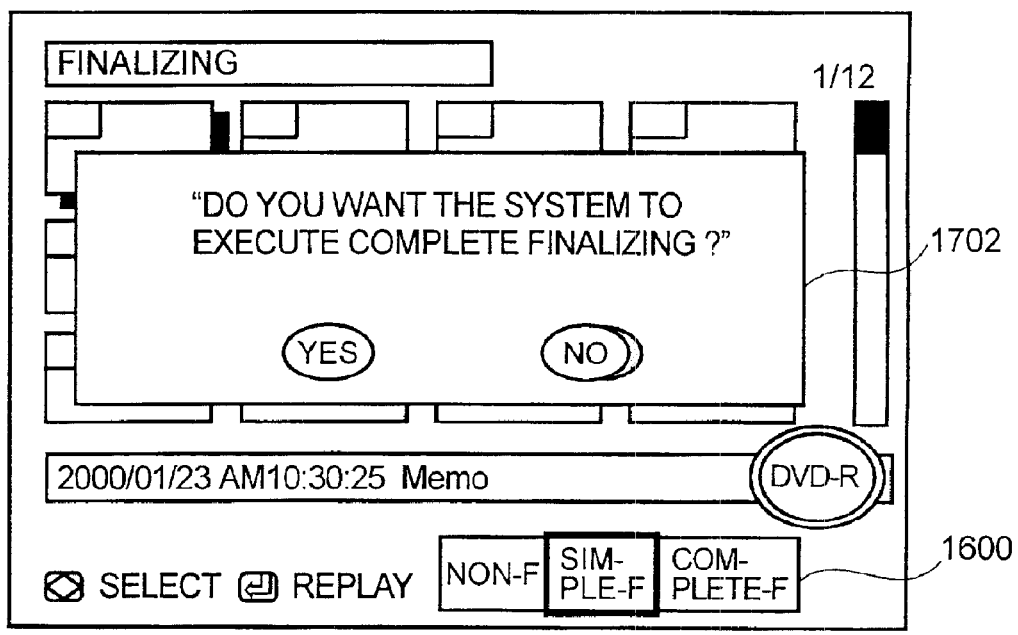

INFORMATION RECORDING APPARATUS AND METHOD

CROSS-REFERENCES TO RELATED APPLICATIONS

This application is related to and claims priority from Japanese Patent Application No. 2001-327114, filed on Oct. 25, 2001.

STATEMENT AS TO RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK.

Not applicable.

BACKGROUND OF THE INVENTION

The present invention relates to techniques for recording information on a recording medium.

Recently, digital versatile disks (DVDs) are becoming popular as media for distributing video titles such as motion pictures so that people can enjoy many kinds of pictures at home. Companies distributing motion pictures are marketing picture titles copied on DVD media as well as videotape for home use, which have generally been used heretofore. General users who have a household DVD player can enjoy motion pictures recorded on a DVD. A DVD-R (DVD-Recordable) which is compatible with the DVD is a write-once, read-many optical disk on which the user can record video and audio information as he or she likes to get. Household video camera products supporting DVD-R recording media are expected to be available in the market. To make a DVD-R disk compatible with and replayable by the above-mentioned DVD player, recording something on the disk must be finally processed by a record-on-medium ending process. As this ending process, at least, a process generally called "finalizing" is performed.

Then, processing details on finalizing will be described. FIG. 2 is provided to explain the finalizing, where inner tracks are shown at the left end and outer tracks at the right end. (Detailed data structure is also disclosed in JP-A-273304/1996.)

Before finalizing, as shown in FIG. 2, a DVD-R has a lead-in/control data zone 200 (where predefined data was already recorded when the DVD-R was manufactured) and a user data zone where user video and audio data was recorded.

Data is written to the lead-in/control data zone when finalizing is performed. Thus, to explicitly denote that the data existing in the lead-in/control data zone before finalizing changes after finalizing, another reference numeral 203 is assigned to the lead-in/control data zone after finalizing.

Then, by finalizing, predetermined information or data is recorded in a lead-in zone 202 (shown in FIG. 2 inner of the lead-in/control data zone 203), a management information zone 204 (shown in FIG. 2 between the lead-in/control data zone 203 and the user data zone 201), a border-out zone 206 (shown in FIG. 2 outer of the user data zone 201), and a lead-out zone 207 (shown in FIG. 2 outer of the user data zone 201).

The lead-out zone is defined to have a track width of 2 mm or more (A in FIG. 2) for a disk with a diameter of 8 cm and its minimum zone shall be provided within the circumference with a diameter of 7 cm (B in FIG. 2). If data to be recorded by the user is small, that is, the width of the user data zone is small, the lead-out zone becomes large accordingly and more time is taken to write predetermined data to the lead-out zone, making the finalizing time longer.

Referential previous inventions pertaining to the video recording apparatus using the DVD-R media have been disclosed; e.g., the one disclosed in JP-A-273304/1996 and the one disclosed in JP-A-148166/2001. In the JP-A-148166/2001, however, a technique for cutting the time required for the record-on-medium ending process including finalizing is not disclosed. The present invention results from our efforts addressing the question of how we can cut such time, as will be described in detail below.

[Problems to be Solved by the Invention]

The above-described record-on-medium ending process practiced in the heretofore-applied manner involves some drawbacks which will be described below.

A problem in the previous video recording technique was posed in the following situation. When the user initiates the record-on-medium ending process after brief shooting, it takes rather long for the video recorder to finalize the medium and complete the ending process. During this process, the user cannot do further shooting and worse must wait for the process to complete.

Meanwhile, optical disk recording media are available with a rewritable type and a write-once, read-many type. The contents of the rewritable-type media can be rewritten as the name is self-explanatory.

On the other hand, something can be written only once to the write-once, read-many type media. As the rewritable-type media, DVD-RAM, DVD-RW, PC-RW, etc. are known. As the write-once, read-many type media, DVD-R is known. Although either type can be used as information-recording media and information can be recorded thereon, the method of recording information on the medium differs, depending on the characteristics of each type. Information-recording apparatus must be capable of recording information, based on the recording method for the medium type on which it records information.

By being processed by the record-on-medium ending process including finalizing, as described above, record carriers such as DVD-R, DVD-RW, OC-RW, etc. have substantially the same characteristics as the replay-only disks when information recorded on them is reproduced. Thus, these record carriers can be replayed by an existing DVD playback apparatus.

While being finalized, the recording medium cannot be removed from the video recorder. The longer the finalization time, the longer the user is left waiting before the user can replace the recording medium with a new one and resume recording.

During the finalization, generally, predetermined information or data is written to the zones remaining unfilled with record. Consequently, the shorter the shooting time, the larger will be the area of the zones that remain unfilled with record. The more predetermined information or data must be written to such zones during finalizing and more time is taken.

As described above, if the shooting time is relatively short, the record-on-medium ending process forces the user to wait for quite some time before replacing the recording medium by a new one and resuming recording. This poses a problem such as inconvenience of use for the user.

It is desirable to provide a solution to the foregoing problem, for example, reducing the wait time involved by the execution of the record-on-medium ending process. Thereby, the operating facility of video recording apparatus is improved, for example, the user can soon begin next shooting with a new recording medium.

SUMMARY OF THE INVENTION

A method and apparatus for recording information on recording media comprise writing necessary information on the recording medium exclusive of other information. The recording medium having contained thereon the necessary information absent the other information can be played back on a playback device. The necessary information represents minimum essential information that enables the playback device to play back user-provided information recorded on the recording medium. The other information represents predetermined data that can subsequently be written on the recording medium.

BRIEF DESCRIPTION OF THE DRAWINGS

FIG. 2 is an illustration representing the states of recording tracks on a DVD-R before and after the disk is finalized;

FIG. 3 is an illustration representing the states of recording tracks on a DVD-R before and after the disk is processed by simple finalizing;

FIG. 6 is illustrative representation of GUI display screens provided in Embodiment 1 of the present invention;

FIG. 7 is illustrative representation of GUI display screens provided in Embodiment 1 of the present invention;

FIG. 10 is illustrative representation of GUI display screens provided in Embodiment 2 of the present invention;

FIG. 11 is illustrative representation of GUI display screens provided in Embodiment 2 of the present invention;

FIG. 16 is illustrative representation of GUI display screens provided in Embodiment 2 of the present invention; and FIG. 17 is illustrative representation of GUI display screens provided in Embodiment 2 of the present invention.

DESCRIPTION OF THE SPECIFIC INVENTION

Figure 1:
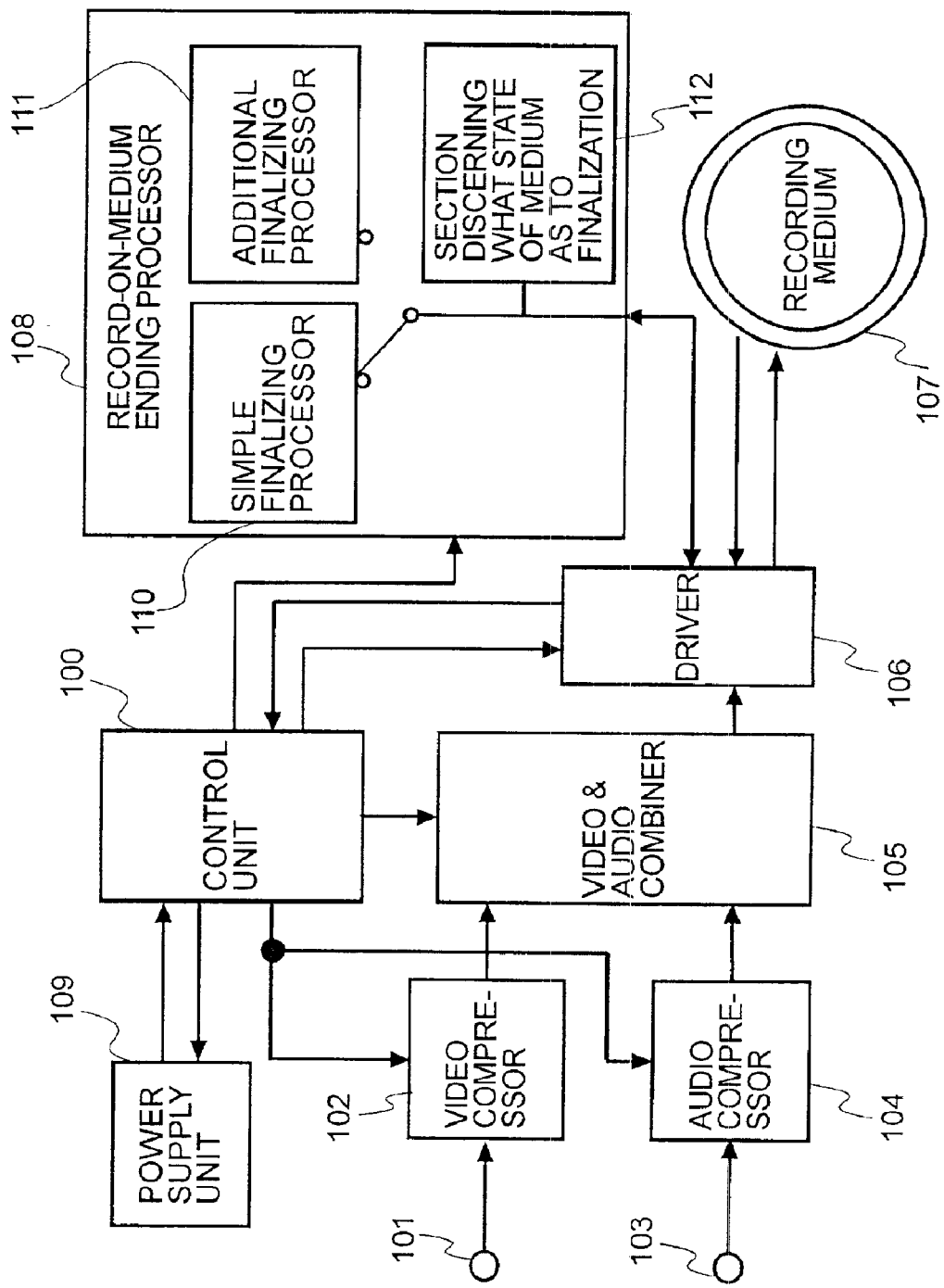
FIG. 1 is a structural diagram of a recording system illustrative of an illustrated Embodiment 1 of the present invention.

Embodiments of the present invention provide a technique of reducing the time required for the execution of the record-on-medium ending process. A brief introduction to the various embodiments of the invention is herein provided. This is followed by a detailed discussion of the illustrated embodiments of the invention.

Note again that the record-on-medium ending process is processing to be performed on the recording medium so that the medium having information (comprising audio and video information) recorded thereon can be replayed by a playback apparatus.

To make the recording medium having information (comprising audio and video information) recorded thereon replayable by a playback apparatus, the processing to be performed on the recording medium comprises writing information that is required for the playback apparatus to execute control for playing back of the recording medium onto the recording medium, thus enabling the playback apparatus to playback the recorded information. Unless such processing is done for the recording medium, the playback apparatus cannot have the control of playing back of the medium.

Meanwhile, the record-on-medium ending process also includes processing that is characterized as follows. Even if the processing is not performed on the recording medium in the record-on-medium ending process, the playback apparatus can have control of playing back of the medium, provided the playback and control method it applies permits. This processing is not always executed on the recording medium during the record-on-medium ending process (or in other words, this is omissible processing).

As implied from the above, the record-on-medium ending process comprises processing that must always be executed to enable the playback apparatus to have playback control and processing that need not always be executed (or that is omissible).

The present invention provides an apparatus configuration and method for recording on a record carrier to enable separately controlling and commanding operation for two steps of the record-on-medium ending process: i.e., a first processing step that must always be executed during the record-on-medium ending process to enable the playback apparatus to have playback control and a second processing step that need not always be executed (or that is omissible).

By applying the above apparatus configuration and method, a record-on-medium ending process in a recording mode can be provided in which only the first processing step is performed to enable the playback apparatus to have playback control. In this recording mode, thus, the second processing step is omitted and the processing time can be cut accordingly. As a matter of course, the longer the time that would be required for the second processing step, the more time required for processing will be cut by omitting this processing. However, some playback devices require the information provided by the second processing step in order to play back the recording medium. Therefore, another recording mode is provided by which the second processing step is performed. The recording medium can therefore be played back on the playback device.

The recording medium processed by the second processing step can be replayed in the same manner under the playback control of the playback apparatus as for a recording medium processed by the heretofore-applied record-on-medium ending process (in which the above-described omission does not take place).

By the way, it is known that, for the foregoing record-on-medium ending process, at least, a process generally called "finalizing" is carried out. The following description will focus on finalizing.

One phase of processing to be performed in the finalizing process is writing file management information or the like to the management information zone. A reading device references this information when accessing the disk to recognize user data as a file when playback or overwrite control of user data is requested. Other phase of processing to be performed in the finalizing comprises writing predetermined information or data to a boundary zone. Such information is required for the pickup of the reading device to obtain an address on the recording medium it accessed, to enable servo control in the pickup tracking direction, and to enable the control in setting the recording medium revolution at a predetermined speed.

Out of the above-described two phases of finalizing, writing of the file management information or the like is essential because the reading device always refers to this information when executing a playback. Thus, the writing of the file management information or the like onto the recording medium cannot be omitted, and thus represents a minimum essential information that must be written to the recording medium.

For the boundary zone, on the other hand, the pickup does not always access it and no access to the boundary zone occurs in some playback apparatus. Thus, the writing of predetermined information or data to the boundary zone can be omitted.

By the way, if a small amount of information is written onto the disk and quite a large area remains unfilled with record on the disk, the boundary zone becomes greater and it will take rather long to write predetermined information or data to that zone. In consequence, it will take rather long to complete finalizing. However, by omitting the writing of predetermined information or data to the boundary zone, the time required for finalizing can be cut.

Based on the above reason the finalizing process in accordance with embodiments of the invention comprises finalizing the disk by writing the minimum amount of file management information or the like that is required for replaying the disk (which is hereinafter referred to as simple finalizing) onto the disk, and finalizing the disk by later writing of predetermined information or data to the boundary zone (which is hereinafter referred to as additional finalizing) onto the disk.

Because the additional finalizing is performed for the disk processed by the simple finalizing, it must be made clear whether the disk has once been processed by the simple finalizing before it is subjected to the additional finalizing.

For this reason, the information-recording apparatus must include means for determining the finalized state of the disk (record carrier). According to the determination made by such means, a decision of whether to execute the additional finalizing is controlled.

Implementation of the means for determining the finalized state of the disk (record carrier) is accomplished by judging whether predetermined information or data has been written to the boundary zone. This can be accomplished by judging whether writing of predetermined information or data to a given zone, for example, a lead-out zone has been completed.

By providing the means for determining the finalized state of the disk (record carrier), a judgment can be made as to whether predetermined information or data has been written to the lead-out zone on the disk (set on the information-recording apparatus) to be processed.

For the disk on which predetermined information or data has not been written to the lead-out zone, thus, it is possible to write predetermined information or data to the lead-out zone. It is also possible to notify the user of the writing by displaying a message, for example, "asking if you want the apparatus to write predetermined information or data to the lead-out zone" before writing predetermined information or data to the lead-out zone. As a matter of course, for the disk on which predetermined information or data has been written to the lead-out zone, it is not necessary to write such to the lead-out zone. Notification with the above message is also unnecessary and no data writing to the lead-out zone takes place. Instead, it is, of course, possible to notify the user that "the apparatus has already written predetermined information or data to the lead-out area."

Figure 5:
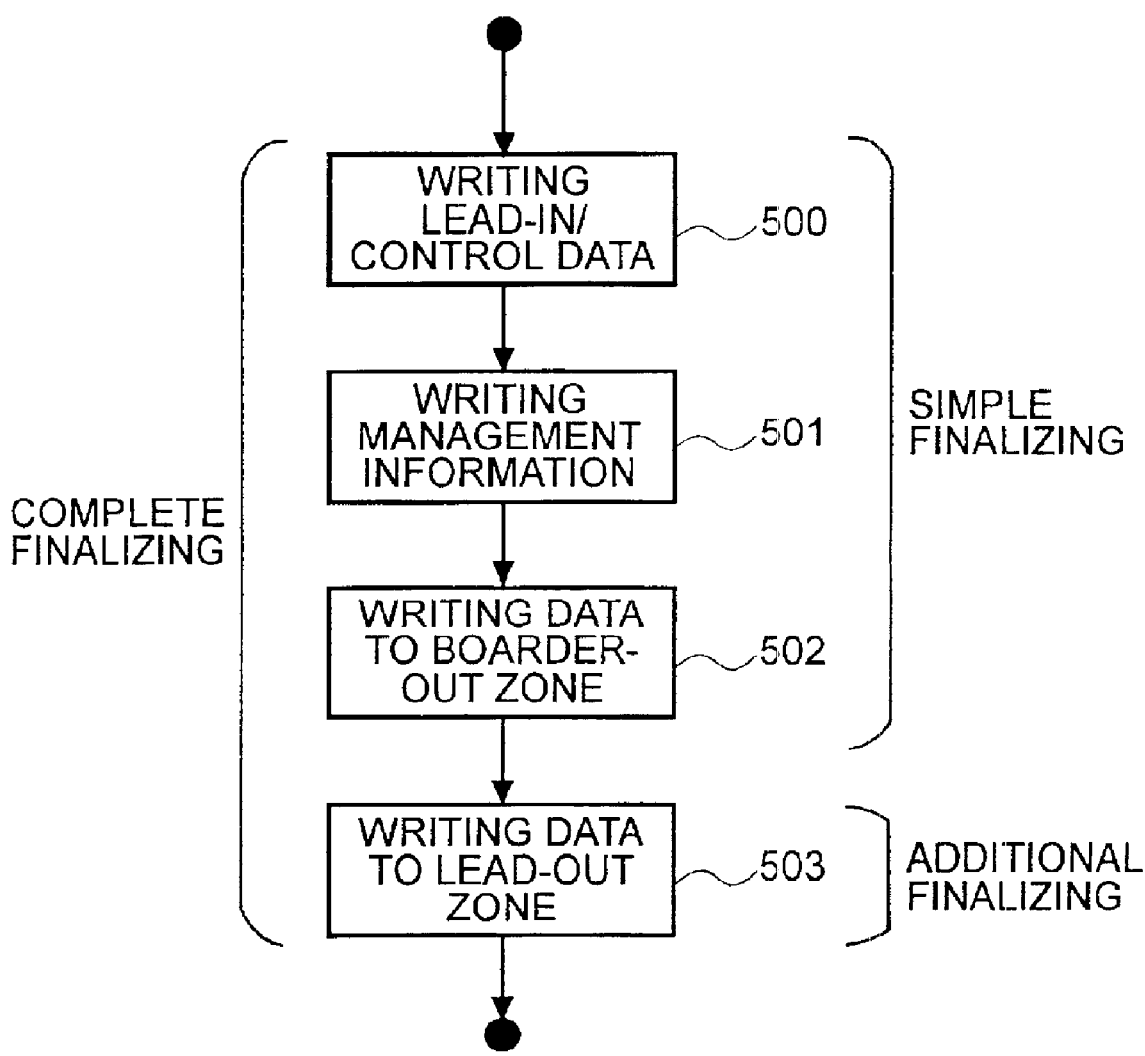
FIG. 5 is an illustration representing the difference between what to be done in simple finalizing and what to be done in complete finalizing.

FIG. 5 is illustrative of the difference between the simple finalizing and complete finalizing (which will be described in detail later).

The simple finalizing is completed by writing data to the lead-in/control data zone 500, management information zone 501, and border-out zone 502. On the other hand, the complete finalizing includes writing data to the lead-out zone 503 in addition to the simple finalizing.

The simple finalizing can be implemented by controlling data writing, for example, in such a manner as to write data the domain control data zone 203, management information zone 204, and border-out zone 206 (outer of the user data zone 201) but not to write data to the lead-out zone 207, as illustrated in FIG. 3. The term "lead-out zone" is an industry standard term. For purposes of the following discussion, the term "boundary zone" will be used to refer to the lead-out zone 207. It will be appreciated that the "boundary zone" is applicable to similarly defined areas on a recording medium that may be referred to by other terminology.

FIG. 5 is illustrative of the difference between the simple finalizing and complete finalizing, but particular operations to be performed in the simple finalizing and the complete finalizing are not limited to those given in FIG. 5. Simple finalizing comprises writing of file management information or the like that is minimally required for replaying the disk. On the other hand, complete finalizing comprises writing of management information or the like that is minimally required for replaying the disk and writing of predetermined information or data to the boundary zone.

The additional finalizing comprises the writing of predetermined information or data to the boundary zone. It is anticipated that a playback apparatus exists that cannot properly replay a disk (record carrier) processed only by the simple finalizing.

For some kind of playback apparatus, for example, its pickup is controlled, subject to that predetermined information or data has been written to the lead-out zone. Unless predetermined information or data has been written to the lead-out zone, such playback apparatus cannot read anything from the lead-out zone. In consequence, the apparatus cannot control the movement of the pickup properly and thus it cannot control the playback of the disk properly.

To have compatibility with such playback apparatus that cannot replay a disk without the information or data in the lead-out zone of the disk, the recording apparatus must be provided with a function of additionally writing predetermined information or data to the lead-out zone. The state of the disk for which the additional finalizing has been completed is equal to the state of the disk for which ordinary finalizing (hereinafter referred to complete finalizing) has been completed. Therefore, even with the above kind of playback apparatus wherein its pickup is controlled, subject to that predetermined information or data has been written to the lead-out zone, the disk for which the additional finalizing has been completed can be replayed properly.

The information-recording apparatus in accordance with the embodiments of the present invention is designed to present an operating guide including an operating options menu display to the user, so that the user can choose between simple finalizing and complete finalizing and command the apparatus to do the required processing. For this purpose, on the display screen of the apparatus, for example, an operating options menu in which simple finalizing and complete finalizing are present is presented to the user, prompting the user to choose either. Then, the user can choose the one he or she likes and commands its execution.

Alternatively, on the display screen of the apparatus, an operating options menu in which finalizing is solely present as the finalizing to be executed is presented to the user (that is, neither simple finalizing nor complete finalizing is present on the options menu display).

Then, if the user chooses finalizing from the operating options menu, the apparatus carries out the simple finalizing for the recording medium that has not yet been finalized.

On the other hand, for the recording medium that has already been processed by simple finalizing, the apparatus automatically switches to the complete finalizing mode and executes the complete finalizing. Specifically, after the user chooses finalizing, even if the user does not choose between simple finalizing and complete finalizing to be executed, the apparatus will execute either finalizing, according to its judgment as to whether the recording medium has once been finalized. This manner can eliminate the user action that comprises viewing the operating options menu each time it is presented on the screen, making a decision and selecting/commanding the desired finalizing. In short, finalizing and selection can be performed more quickly.

To carry out secure finalizing operation to the user, embodiments of the present invention include means for allowing the user to confirm what finalizing will be executed. Specifically, this includes means for allowing the user to confirm whether to enable the execution of finalizing by displaying a message suitable for the finalizing to be executed before the apparatus starts the finalizing (simple finalizing, complete finalizing, or additional finalizing).

The apparatus informs the user that finalizing will be executed, for example, by displaying a message asking if "you want the apparatus to execute finalizing." Only if the user chose to "execute finalizing," the apparatus executes the finalizing. If, for example, the user chose to "abort finalizing," the apparatus does not execute the finalizing. By making the user take notice of finalizing execution in this way, incorrect execution of finalizing by the user's mistake or erroneous operation such as pushing a wrong button can be avoided. Once a disk has been finalized, information will no longer be written to the disk. Especially in view hereof, it is desirable to execute finalizing after the user's confirmation.

For portable information-recording apparatus, a battery pack is usually used to supply power to the apparatus. If it takes rather long to complete the record-on-medium ending process as noted above and the battery power is almost used up, the finalizing operation may stop in the half-done state due to the disruption of power supply from the battery which may occur during that processing. In that event, a recording medium having something recorded thereon is made not replayable by a playback apparatus.

Thus, embodiments of the present invention include means for determining a power source steady or not in supplying power to the information-recording apparatus. According to such determination, if AC power is not supplied (instead, for example, a battery pack is supplying power), the apparatus exclusively executes the simple finalizing in normal mode even if the simple finalizing is deselected by the user.

Consequently, the time required for the record-on-medium ending process can be cut and there is less possibility of finalizing process abortion due to the supply power disruption during that processing. Such trouble can be avoided that, as it happens, a recording medium having something recorded thereon is made not replayable by a playback apparatus.

The foregoing was described with the detailed explanation on the means and apparatus configurations thereof for fulfilling the purpose of solving the existing problem in question. Based on the foregoing matters of description, the means for solving the problem and apparatus configuration in accordance with embodiments of the present invention will be further described below in another wording. An information-recording apparatus for recording information on an information-recording medium from which a playback apparatus can reproduce the information recorded thereon is provided.

In a first embodiment of the invention, an information-recording apparatus comprises:

means for recording information on the information-recording medium;

means for executing a record-on-medium ending process in which the information-recording medium is processed so as to be replayable by the playback apparatus; and means for controlling the information-recording apparatus.

The above means for executing the record-on-medium ending process comprises:

means for executing a first record-on-medium ending process including writing of information that is required for the playback apparatus when performing playback processing onto the information-recording medium; and means for executing a second record-on-medium ending process not including the writing of information that is required for the playback apparatus when performing playback processing onto the information-recording medium.

The information-recording apparatus configured in the first embodiment of the invention may operate in one mode below: when the record-on-medium ending process is executed under the control of the control means, the means for executing the first record-on-medium ending process, including the writing of enablement information that is required for the playback apparatus (to enable performing playback processing) onto the information-recording medium, is set inoperative, whereas the means for executing the second record-on-medium ending process, not including the writing of enablement information onto the information-recording medium, is put into operation.

The information-recording apparatus configured in the first embodiment of the invention may operate in another mode below: when the record-on-medium ending process is executed under the control of the control means, the means for executing the second record-on-medium ending process, not including the writing of enablement information onto the information-recording medium, is inoperative, whereas the means for executing the first record-on-medium ending process, including the writing of enablement information onto the information-recording medium, is put into operation.

In accordance with a second embodiment of the present invention, an information-recording apparatus for recording information on an information-recording medium is provided that comprises:

means for recording information on the information-recording medium;

means for executing a record-on-medium ending process including writing of predetermined information to a boundary zone on the information-recording medium; and means for controlling the information-recording apparatus.

The above means for executing the record-on-medium ending process comprises:

means for executing a first record-on-medium ending process including the writing of predetermined information to the boundary zone: and means for executing a second record-on-medium ending process not including the writing of predetermined information to the boundary zone.

The information-recording apparatus configured in the second embodiment of the invention may operate in one mode below: when the record-on-medium ending process is executed under the control of the control means, the means for executing the first record-on-medium ending process is set inoperative, whereas the means for executing the second record-on-medium ending process is put into operation.

The information-recording apparatus configured in the second embodiment of the invention may operate in another mode below: when the record-on-medium ending process is executed under the control of the control means, the means for executing the second record-on-medium ending process is inoperative, whereas the means for executing the first record-on-medium ending process is put into operation.

In accordance with a third embodiment of the present invention, an information-recording apparatus is provided that comprises:

means for recording information on the information-recording medium;

means for executing a record-on-medium ending process including writing of predetermined information to a boundary zone on the information-recording medium and writing of management information to a management information zone on the information-recording medium; and means for controlling the information-recording apparatus.

The above means for executing the record-on-medium ending process comprises:

means for executing a first record-on-medium ending process including the writing of predetermined information to the boundary zone; and means for executing a second record-on-medium ending process including the writing of management information to the management information zone.

In accordance with a fourth embodiment of the present invention, an information-recording apparatus is provided that comprises:

means for recording information on the information-recording medium, means for executing a record-on-medium ending process including writing of predetermined information to a boundary zone on the information-recording medium and writing of management information to a management information zone on the information-recording medium, and means for controlling the information-recording apparatus, wherein, when the record-on-medium ending process is executed under the control of the control means, the writing of management information to the management information zone is performed, but the writing of predetermined information to the boundary zone being set disabled.

In accordance with a fifth embodiment of the present invention, an information-recording apparatus is provided that comprises:

means for recording information on the information-recording medium, means for executing a record-on-medium ending process including writing of predetermined information to a boundary zone on the information-recording medium and writing of management information to a management information zone on the information-recording medium, and means for controlling the information-recording apparatus, wherein, when the record-on-medium ending process is executed under the control of the control means, the writing of predetermined information to the boundary zone is performed, but the writing of management information to the management information zone being set disabled.

Moreover, the information-recording apparatus thus configured in accordance with the present invention further comprises:

means for determining the finalization state of the medium, which determines what state of the information-recording medium that may have once been subjected to the record-on-medium ending process or may have not been done, whereby judgment is made as to what state of the information-recording medium which may have once been subjected to the record-on-medium ending process or may have not been done.

Moreover, the information-recording apparatus thus configured in accordance with the present invention further comprises:

means for displaying the finalization state of the medium, which displays what state of the information-recording medium that may have once been subjected to the record-on-medium ending process or may have not been done, wherein, according to the determination of what state of the information-recording medium, made by the means for determining the finalization state of the medium, if the information-recording medium has once been subjected to the record-on-medium ending process, but predetermined information has not been written to its boundary zone, the means for displaying the finalization state of the medium displays a message that writing of predetermined information to the boundary zone is not yet done.

Moreover, the information-recording apparatus thus configured in accordance with the present invention further comprises:

means for displaying the finalization state of the medium, which displays what state of the information-recording medium that may have once been subjected to the record-on-medium ending process or may have not been done, wherein, according to the determination of what state of the information-recording medium, made by the means for determining the finalization state of the medium, if the information-recording medium has not been subjected to the record-on-medium ending process, the means for displaying the finalization state of the medium displays a message that the record-on-medium ending process is not yet executed for the information-recording medium.

Moreover, the information-recording apparatus thus configured in accordance with the present invention further comprises:

means for displaying the finalization state of the medium, which displays what state of the information-recording medium that may have once been subjected to the record-on-medium ending process or may have not been done, wherein, according to the determination of what state of the information-recording medium, made by the means for determining the finalization state of the medium, if the information-recording medium has been subjected to the record-on-medium ending process including writing of predetermined information to its boundary zone and writing of management information to its management information zone, the means for displaying the finalization state of the medium displays a message that the record-on-medium ending process, including writing of predetermined information to the boundary zone and writing of management information to the management information zone, has been executed for the information-recording medium.

Moreover, the information-recording apparatus thus configured in accordance with the present invention further comprises:

means for displaying the finalization state of the medium, which displays what state of the information-recording medium that may have once been subjected to the record-on-medium ending process or may have not been done, wherein, according to the determination of what state of the information-recording medium, made by the means for determining the finalization state of the medium, if the information-recording medium has once been subjected to the record-on-medium ending process, but predetermined information has not been written to its boundary zone, then, the writing of predetermined information to the boundary zone is performed.

Moreover, the information-recording apparatus thus configured in accordance with the present invention further comprises:

means for displaying the finalization state of the medium, which displays what state of the information-recording medium that may have once been subjected to the record-on-medium ending process or may have not been done, wherein, according to the determination of what state of the information-recording medium, made by the means for determining the finalization state of the medium, if the information-recording medium has not been subjected to the record-on-medium ending process, then, the writing of management information to the management information zone is performed, but the writing of predetermined information to the boundary zone being set disabled.

Illustrative embodiments of the present invention will now be described.

FIG. 1 is a high level block diagram illustrating various functional portions of an embodiment of a recording system on which recording in accordance with the present invention is carried out. The system configured is assumed capable of recording on both DVD-RAM and DVD-R optical disks.

In FIG. 1, reference numeral 100 denotes a control unit that controls the start and end timing of recording and performs other operations, making sure of the determination of which type of recording medium and monitoring the power supply state. Reference numeral 101 denotes a video input terminal at which digital video signals are input. Reference numeral 102 denotes a video compressor for compressing video signals delivered from the video input terminal 101. Reference numeral 103 denotes an audio input terminal at which digital audio signals are input. Reference numeral 104 denotes an audio compressor for compressing audio signals delivered from the audio input terminal 103. Reference numeral 105 denotes a video and audio combiner that combines video data delivered from the video compressor 102 and audio data delivered from the audio compressor 104 into system streams complying with the standards such as MPEG. Reference numeral 106 denotes a driver. After determining which type of recording medium, the driver executes writing the system streams generated by the video and audio combiner 105 onto or reading streams from the medium set on it, as appropriate for the medium type. Reference numeral 107 denotes a recording medium to which the driver 106 writes streams or from which the driver 106 reads streams, which may be either DVD-RAM or DVD-R.

Reference numeral 108 denotes a record-on-medium ending process that switches between two modes of record-on-medium ending processing, depending on the type of the recording medium 107; namely, DVD-RAM or DVD-R. The record-on-medium ending process comprises a simple finalizing process 110, an additional finalizing process 111, and a determining process 112 to determine the "finalization" state of the recording medium, namely, whether it has been finalized and the type of finalization—simple finalizing only or simple and additional finalizing. Switchover of execution control between the simple finalizing process 110 and the additional finalizing process 111 is activated by user's mode selection/command or automatically takes place, according to the state of the recording medium.

The high level functional block diagram of FIG. 1 shows the record-on-medium process 108 as a separate functional portion. In one variation of the embodiment shown in the figure, these record-on-medium process comprises logic which is configured to control the driver 106 to achieve the functions discussed above.

In another variation of the embodiment shown in FIG. 1, the record-on-medium process 108 can be incorporated into the control unit 100 in a suitable computer program format. According to this variation, the computer program comprises program code for each of the simple finalizing process 110, the additional finalizing process 111, and the determining process 112. The computer program code for the simple finalizing process 110 and the additional finalizing process 111 would control the driver 106 accordingly to the achieve the functions discussed above.

In still another variation of the embodiment shown in FIG. 1, the record-on-medium process 108 can be a combination of logic and suitable computer programming. Clearly, such implementation details lend themselves to many solutions which will become readily apparent to one of ordinary skill in the relevant art, in view of the foregoing.

Reference numeral 109 denotes a power supply unit in which a battery pack (a rechargeable storage battery, a set of dry cells, etc.) may be installed or which may be connected to commodity AC power (hereinafter referred to as AC power).

The control unit 100 also makes sure of the determination of which type of recording medium. However, the present configuration may include a special unit for making sure of the determination of which type of recording medium (in another wording, means for determining which type of recording medium) separately from the control unit 100.

Alternatively, the function of the determining unit 112 may be fulfilled by the control unit 100.

First, a recording method will now be explained. When the user requests the system to record, the control unit makes the driver 106 determine which of DVD-RAM and DVD-R is set on the driver as the recording medium 107. The control unit retains the result of the determination of disk type, using the flag for this purpose. Then, the control unit starts the preparation for recording such as initializing the blocks on the disk as required. The determination of disk type may be made when the disk is inserted in place on the system. After the initialization, the control unit activates an A/D converter or the like which is not shown in FIG. 1 to input video data and audio data to the system. After passing through the A/D converter, digital video data is input through the video input terminal 101 and digital audio data is input through the audio input terminal 103 into the system. The thus input digital video signals are assumed having been subjected to processing in terms of luminance and color as required. The video compressor 102 compresses the video signals in compliance with the standards of MPEG. Buffers for temporarily storing data may be installed before and after the video compressor if necessary. On the other hand, the digital audio signals input through the audio input terminal 103 pass through a buffer or the like which may be installed if necessary and enter the audio compressor 104. The audio compressor 104 compresses the audio signals in compliance with the standards of MPEG or the Dolby digital (AC3) standards. For linear PCM recording, such compression is not performed. From the compressed video data generated by the video compressor 102 and the compressed audio data generated by the audio compressor 104, the video audio combiner 105 generates system streams complying with the standards of MPEG and moreover puts the data in packets to the appropriate DVD format. In the case of DVD-RAM, arranging the data in packets to the video recording standards is performed. In the case of DVD-R, arranging the data in packets to the video format for replay-only disks is performed. In most cases of similar system implementation, buffers are installed before and after the video and audio combiner. The system streams thus generated by the video and audio combiner pass through a buffer or the like which is not shown in FIG. 1 and are recorded on the recording medium 107. Then, when the user issues a command to terminate recording, the control unit executes the command for all blocks. (For this command, for example, an operation button such as a record button is pressed. General recording/playback apparatus has a record button for starting and terminating recording and a replay button for replay execution. These buttons are referred to as operation buttons.) The control unit also deactivates the A/D converter or the like which is not shown in FIG. 1.

By the way, finalizing to be performed for DVD-R is not performed for disks prepared in the DVD-RAM format. If streams are recorded on a disk prepared in the DVD-RAM format, finalizing the disk is not performed.

On the other hand, if streams are recorded on a DVD-R, the disk must be finalized to enable an existing DVD playback apparatus to playback the recorded material. However, once the disk has been finalized, further writing to the disk becomes impossible. In view of general application, operation to allow the user to specify whether finalizing should be executed is preferable to a manner in which the system always executes finalizing at the end of recording on the disk. Of course, automatic finalizing at the end of recording on a DVD-R may be applied.

Then, an Embodiment 1 in which simple finalizing and complete finalizing are performed on the above-described system shown in FIG. 1 will be explained below with reference to FIGS. 4, 6, and 7.

A recording medium subjected to complete finalizing is regarded as the one subjected to the heretofore-applied finalizing.

Thus, a playback apparatus can handle the recording medium subjected to complete finalizing as the one subjected to the heretofore-applied finalizing and can perform the same processing for playback or the like for the medium.

In the following description of Embodiment 1, for the convenience of explanation, it is assumed that processing referred to as complete finalizing comprises simple finalizing which is executed for a disk and additional finalizing which is executed, if necessary, for the disk.

Figure 4:
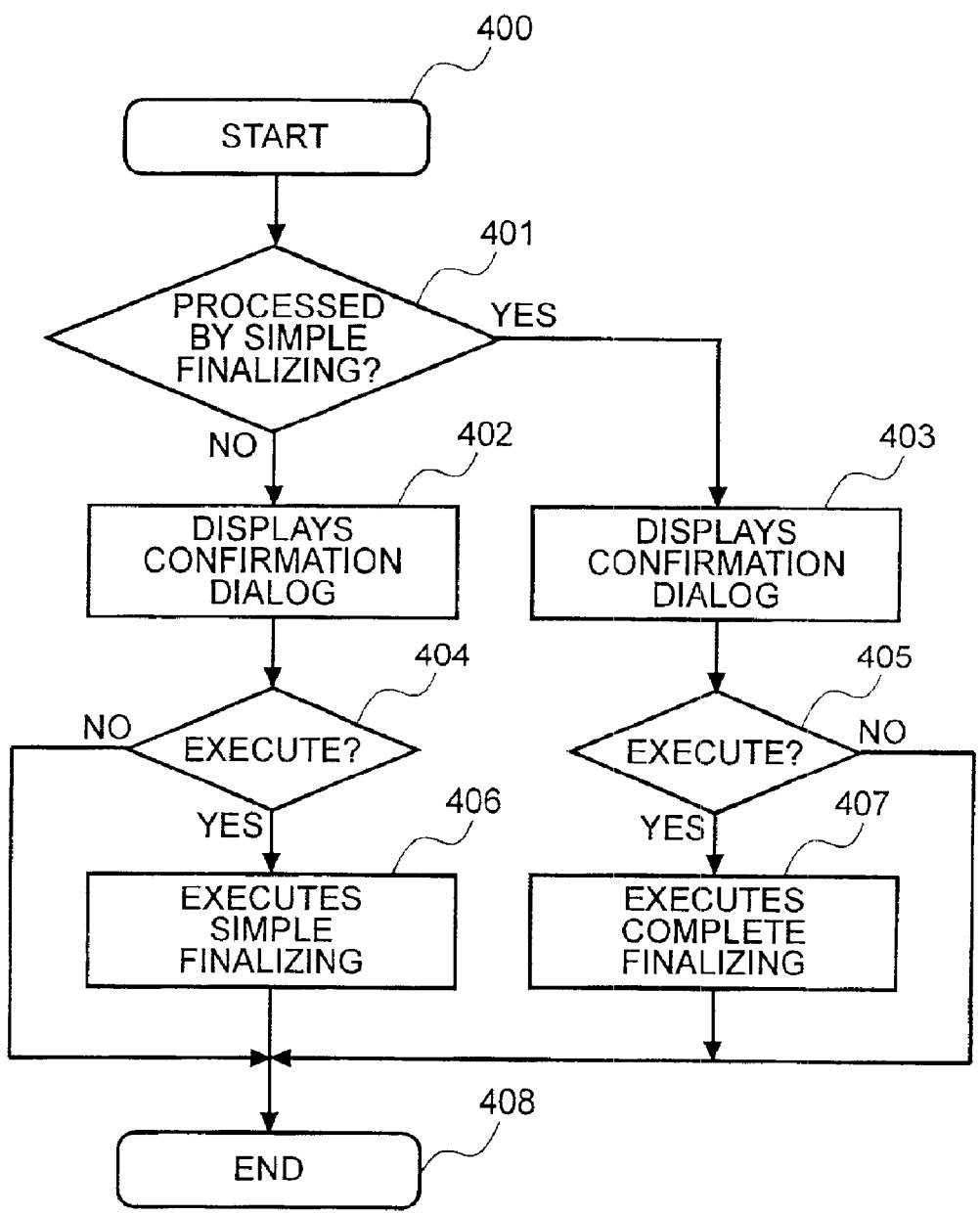
FIG. 4 is a flowchart illustrating a finalizing control procedure according to Embodiment 1 of the present invention.

FIG. 4 is a flowchart illustrating the procedure of finalizing to be performed on the present system.

When a command to start finalizing (400) is issued from the user, first, judgment is made as to whether the disk, namely, the recording medium under processing, has been processed by simple finalizing (401). If the disk has not yet been processed by simple finalizing (NO, 401), a simple finalizing confirmation message (for example, an illustrative message "Do you want the system to execute simple finalizing?" given in the dialog box 701 in FIG. 7) is displayed (402), allowing the user to confirm whether simple finalizing should be executed.

If the user requests the system to execute simple finalizing (chooses YES, 404), the system executes simple finalizing (405) and terminates the processing (408). If the user requests the system not to execute finalizing (chooses NO, 404), the system terminates the processing (408) without executing simple finalizing.

If, on the other hand, the disk has been processed by simple finalizing (YES, 401), a complete finalizing confirmation message (for example, an illustrative message "Do you want the system to execute complete finalizing?" given in a dialog box 702 in FIG. 7) is displayed (403), allowing the user to confirm whether complete finalizing should be executed.

If the user requests the system to execute complete finalizing (chooses YES, 405), the system executes complete finalizing (407) and terminates the processing. If the user requests the system not to execute complete finalizing (chooses No, 405), the system terminates the processing (408) without executing complete finalizing.

FIGS. 6 and 7 show illustrative operation screens of a graphical user interface (GUI) of the system, showing various informational elements comprising the GUI in accordance with an embodiment of the invention. Reference numeral 601 denotes thumbnail representations of images. The thumbnails are small representations of recorded images. The thumbnails of the initial ones of the recorded images are shown so that the user can soon recognize what has been recorded on the disk. Reference numeral 602 denotes an indicator of the recording medium type. Reference numeral 603 denotes a display zone where the state of operation in process is shown. As an illustration, "all programs" are shown in this zone, which indicates that all recorded audio and video data units are being processed. Reference numeral 604 denotes an indicator of what state of the recording medium as to whether the recording medium has been finalized; if finalized, which of simple finalizing and complete finalizing by which it has been finalized (hereinafter, this indicator is referred to as a finalize indicator 604).

When the user requests the system to start finalizing, a pull-down menu 610 appears on the illustrative screen 600 shown in FIG. 6. When the user chooses an item "finalizing" from the pull-down menu 610, "finalizing" appears as processing that the system is going to execute in the display zone 700 shown in FIG. 7. Then, the user can know that system operation has changed to finalizing. At the same time, a dialog box for finalizing confirmation is displayed. This is the confirmation dialog box 701. The illustrative message "Do you want the system to execute simple finalizing?" given in the confirmation dialog box 701 is not limited to this wording. This may be replaced by another message, for example, "Do you really want the disk finalized?" provided the message prompts the user to do the confirmation.

At this time, the finalize indicator 703 shown in FIG. 7 indicates that the recording medium has not been finalized (the "non-F" part of the finalized indicator 703 in FIG. 7 is marked by being framed with bold lines).

Displaying the confirmation dialog box 701 corresponds to the step of displaying confirmation dialog 402 in FIG. 4. If the user wants to abort the finalizing, choose "NO" (click "NO" in the confirmation dialog box 701 in FIG. 7) (resulting in "NO" execution in the step 404 in FIG. 4). If the user wants the system to execute finalizing, choose "YES" (click "YES" in the confirmation dialog box 701 in FIG. 7) (resulting in "YES" in the step 404 in FIG. 4).

If, on the other hand, the judgment is that the disk has already been processed by simple finalizing (YES, 401), the confirmation dialog box 702 is displayed in the step of displaying confirmation dialog 403. The illustrative message given in the confirmation dialog box 702 in FIG. 7 is not limited to this wording. This may be replaced by another message, provided the message prompts the user to do the confirmation. At this time, the finalize indicator 704 shown in FIG. 7 indicates that the recording medium has already been simply finalized (the simple-F part of the finalize indicator 703 in FIG. 7 is marked by being framed with bold lines).

As described above, the appropriate message is displayed before the system starts finalizing to inform the user of what finalizing will be executed so that the user can confirm whether the finalizing should be executed. Such message display can prevent erroneous operation that causes the processing to continue by the user's mistake, and operability and safety are improved.

Then, an Embodiment 2 will be described with reference to FIGS. 8, 9, 10, 11, 15, 16, and 17.

The same system structure as for Embodiment 1 applies.

Figure 8:
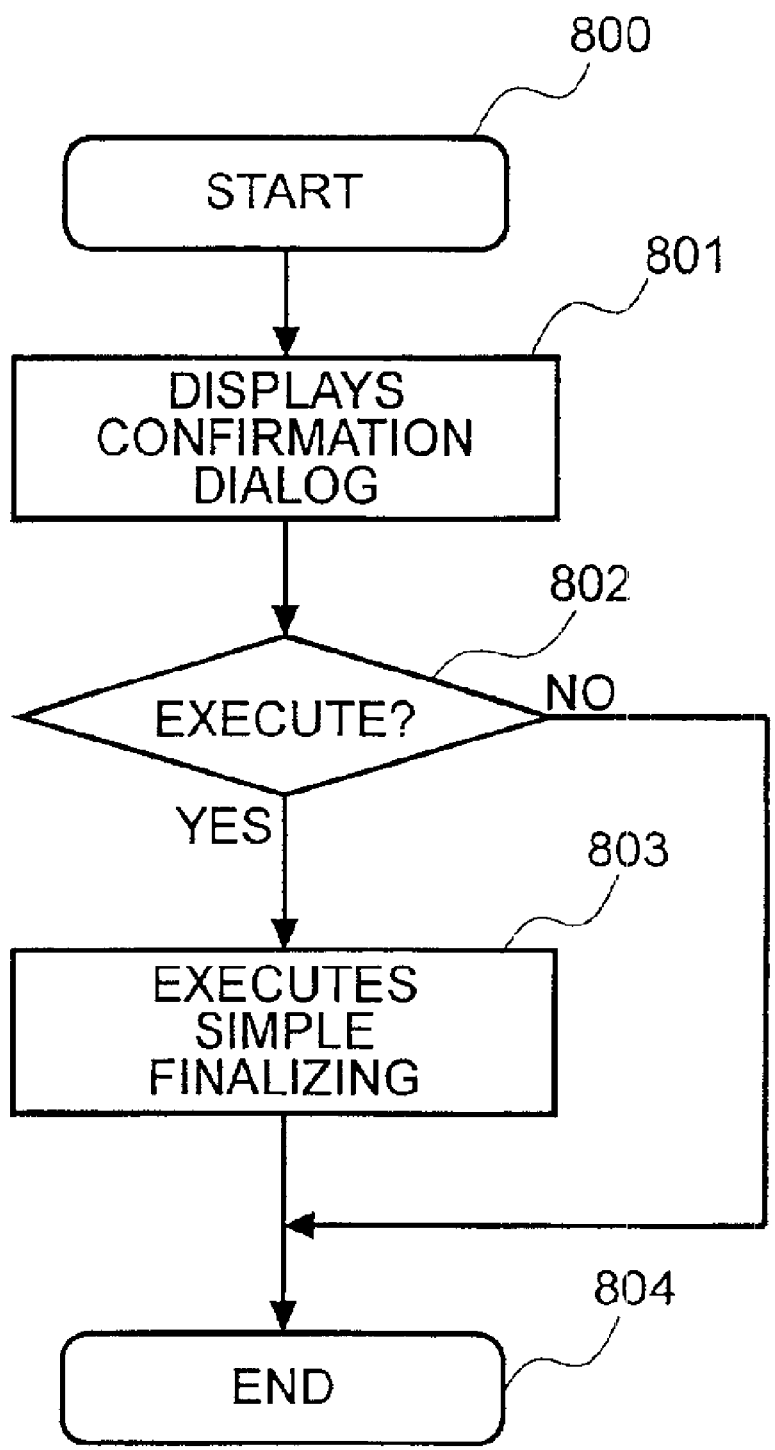
FIG. 8 is a flowchart of a simple finalizing control procedure according to another illustrated Embodiment 2 of the present invention.

FIG. 8 is a flowchart illustrating the procedure of simple finalizing to be performed on the present system.

When a command to start simple finalizing (800) is issued from the user, a simple finalizing confirmation message (for example, the illustrative message "Do you want the system to execute simple finalizing?" given in the dialog box 701 in FIG. 7) is displayed (801), allowing the user to confirm whether simple finalizing should be executed.

If the user requests the system to execute simple finalizing (chooses YES, 802), the system executes simple finalizing (803) and terminates the processing (804). If the user requests the system not to execute finalizing (chooses NO, 802), the system terminates the processing (804) without executing simple finalizing.

Figure 9:
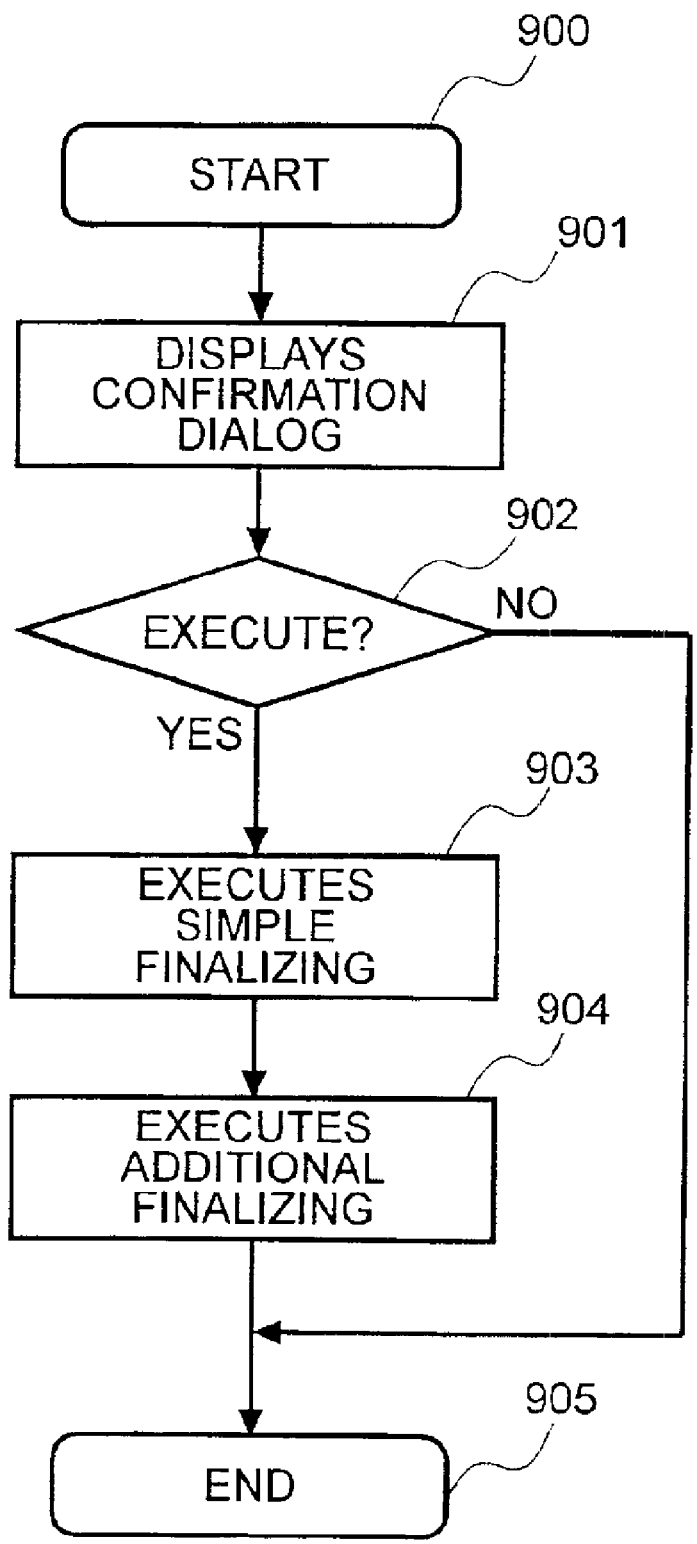
FIG. 9 is a flowchart of a complete finalizing control procedure according to Embodiment 2 of the present invention.

FIG. 9 is a flowchart illustrating the procedure of complete finalizing to be performed on the present system.

When a command to start complete finalizing (900) is issued from the user, a complete finalizing confirmation message is displayed (901), allowing the user to confirm whether complete finalizing should be executed.

If the user requests the system to execute complete finalizing (chooses YES, 902), the system executes simple finalizing (903) and additional finalizing (904), then terminates the processing (905). If the user requests the system not to execute complete finalizing (chooses NO, 902), the system terminates the processing (905) without executing complete finalizing.

Figure 15:
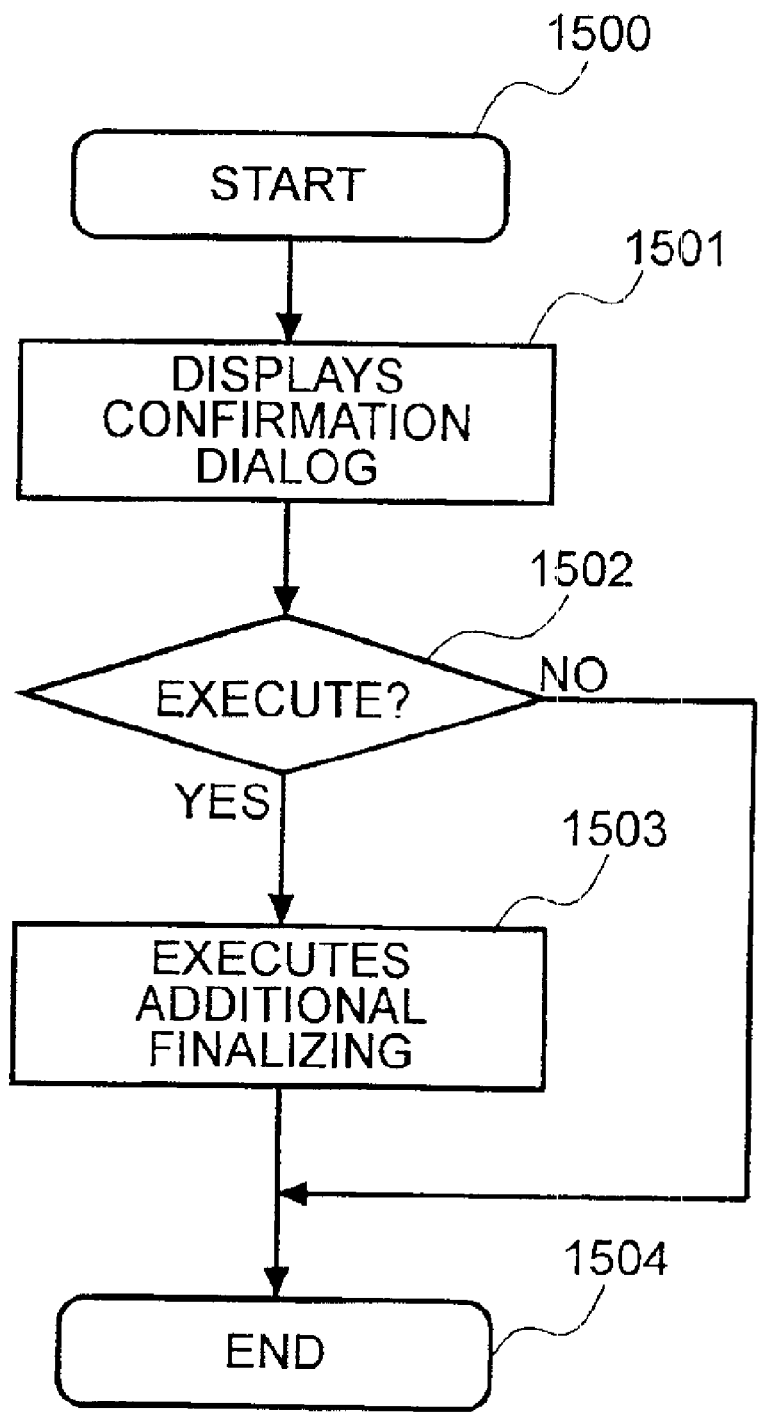
FIG. 15 is a flowchart of an additional finalizing control procedure according to Embodiment 2 of the present invention.

FIG. 15 is a flowchart illustrating the procedure of additional finalizing to be performed on the present system.

When a command to start additional finalizing (1500) is issued from the user, a additional finalizing confirmation message is displayed (1501), allowing the user to confirm whether additional finalizing should be executed.

If the user requests the system to execute additional finalizing (chooses YES, 1502), the system executes additional finalizing (1503) and terminates the processing (1504). If the user requests the system not to execute additional finalizing (chooses NO, 1502), the system terminates the processing (1504) without executing additional finalizing.

FIGS. 10, 11, 16, and 17 show illustrative operation screens of GUI of the system. The same screen structure as shown in FIGS. 6 and 7 applies.

FIGS. 10 and 11 show the illustrative screens for a case where the recording medium has not been finalized, as is indicated by the finalize indicator 1004.

FIGS. 16 and 17 show the illustrative screens for a case where the recording medium has been simply finalized, as is indicated by the finalize indicator 1600.

With reference to FIGS. 10 and 11, operation in the case where the recording medium has not been finalized will now be explained.

When the user requests the system to start finalizing, a pull-down menu 1010 appears on the illustrative screen 1000 shown in FIG. 10. When the user chooses a "finalizing" item from the pull-down menu 1010, "finalizing" appears as processing that the system is going to execute in the display zone 1100 shown in FIG. 11. Then, the user can know that system operation has changed to finalizing. At the same time, a dialog box for finalizing confirmation is displayed.

If the user chooses "simple finalizing" from the pull-down menu 1010 (in this case, the procedure illustrated in the flowchart of FIG. 8 will be carried out), a conformation dialog box 1101 in FIG. 11 is displayed. The illustrative message "Do you want the system to execute simple finalizing?" given in the confirmation dialog box 1101 is not limited to this wording. This may be replaced by another message, for example, "Do you really want the disk finalized?" provided the message prompts the user to do the confirmation.

If the user chooses "complete finalizing" from the pull-down menu 1010 in FIG. 10 (in this case, the procedure illustrated in the flowchart of FIG. 9 will be carried out), a conformation dialog box 1102 in FIG. 11 is displayed. The illustrative message given in the confirmation dialog box 1102 is not limited to this wording. This may be replaced by another message, provided the message prompts the user to do the confirmation.

Displaying the confirmation dialog box 1101 in FIG. 11 corresponds to the step of displaying confirmation dialog 801 in FIG. 8. If the user wants to abort the simple finalizing, choose "NO" (click "NO" in the confirmation dialog box 1101 in FIG. 11). If the user wants the system to execute simple finalizing, choose "YES" (click "YES" in the confirmation dialog box 1101 in FIG. 11).

Displaying the confirmation dialog box 1102 in FIG. 11 corresponds to the step of displaying confirmation dialog 901 in FIG. 9. If the user wants to abort the complete finalizing, choose "NO" (click "NO" in the confirmation dialog box 1102 in FIG. 11). If the user wants the system to execute complete finalizing, choose "YES" (click "YES" in the confirmation dialog box 1102 in FIG. 11).

With reference to FIGS. 16 and 17, operation in the case where the recording medium has been simply finalized will now be explained.

When the user requests the system to start finalizing, a pull-down menu 1610 appears on the illustrative screen 1000 shown in FIG. 16. When the user chooses a "finalizing" item (additional or complete finalizing) from the pull-down menu 1610, "finalizing" appears as processing that the system is going to execute in the display zone 1100 shown in FIG. 16. Then, the user can know that system operation has changed to finalizing. At the same time, a dialog box for finalizing confirmation is displayed.

If the user chooses "additional finalizing" from the pull-down menu 1610 (in this case, the procedure illustrated in the flowchart of FIG. 15 will be carried out), a conformation dialog box 1701 in FIG. 17 is displayed. The illustrative message "Do you want the system to execute additional finalizing?" given in the confirmation dialog box 1701 is not limited to this wording. This may be replaced by another message, for example, "Do you really want the disk finalized?" provided the message prompts the user to do the confirmation.

If, on the other hand, the user chooses "complete finalizing" from the pull-down menu 1610 in FIG. 16 (in this case, the procedure illustrated in the flowchart of FIG. 9 will be carried out), a conformation dialog box 1702 in FIG. 17 is displayed. The illustrative message given in the confirmation dialog box 1702 is not limited to this wording. This may be replaced by another message, provided the message prompts the user to do the confirmation.

Displaying the confirmation dialog box 1701 corresponds to the step of displaying confirmation dialog 1501 in FIG. 15. If the user wants to abort the additional finalizing, choose "NO" (click "NO" in the confirmation dialog box 1701 in FIG. 17). If the user wants the system to execute additional finalizing, choose "YES" (click "YES" in the confirmation dialog box 1701 in FIG. 17).

Displaying the confirmation dialog box 1702 corresponds to the step of displaying confirmation dialog 901 in FIG. 9. If the user wants to abort the complete finalizing, choose "NO" (click "NO" in the confirmation dialog box 1702 in FIG. 17). If the user wants the system to execute complete finalizing, choose "YES" (click "YES" in the confirmation dialog box 1702 in FIG. 17).

If it is discernable that the recording medium has already been simply finalized as is the case in Embodiment 1, means for informing the user that simple finalizing is unnecessary should be provided. Moreover, to give the user an advice when it has been discerned that the medium has never been finalized, means for informing the user that the processing time can be cut if you choose simple finalizing that is quicker than complete finalizing (with a message, for example, "Simple finalizing is quicker to be done") should be provided.

As described above, by informing the user of what finalizing will be executed before the system starts finalizing, operability is improved as in the case in Embodiment 1.

Figure 12:
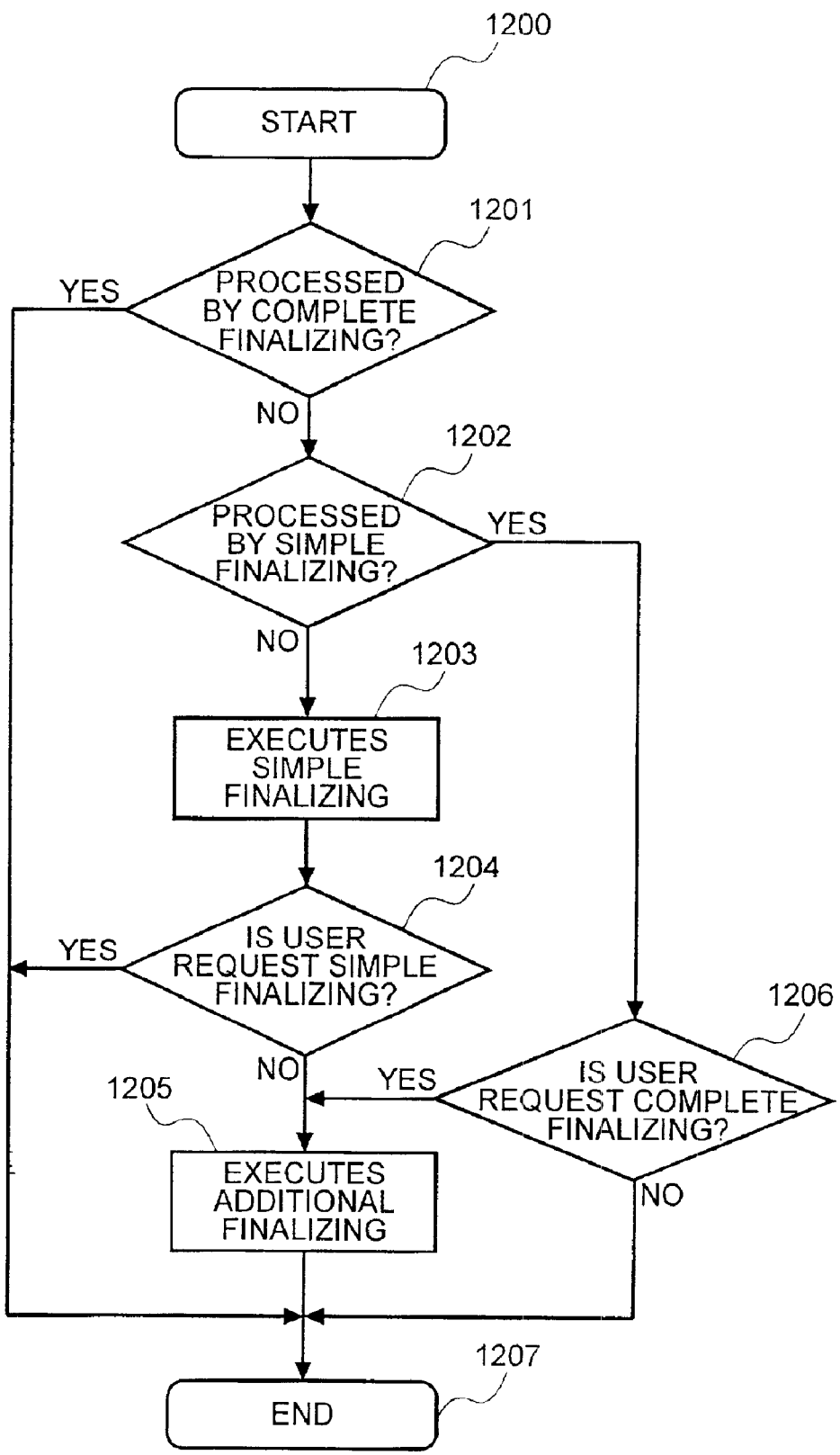
FIG. 12 is a flowchart of yet another procedure of finalizing in accordance with an embodiment of the present invention.

Then, yet another procedure of finalizing as an Embodiment 3 of the present invention will be explained. FIG. 12 is a flowchart illustrating this finalizing procedure. When the finalizing process starts (1200), first, judgment is made as to whether the recording medium under processing has been processed by complete finalizing (1201).

If the medium has not been processed by complete finalizing (NO, 1201), judgment is made as to whether it has been processed by simple finalizing (1202). If it has not been processed by simple finalizing (NO, 1202), the system executes simple finalizing (1203).

Then, judgment is made as to whether user request is simple finalizing of the medium under processing (1204). If user request is simple finalizing (YES, 1204), the system terminates the processing (1207).

If, on the other hand, user request is complete finalizing, not simple finalizing (NO, 1204), the system consecutively executes additional finalizing (1205) and terminates the processing (1207).

If the medium has been processed by simple finalizing by judgment (YES, 1202), judgment is made as to whether user request is complete finalizing of the medium under processing (1206). If user request is complete finalizing (YES, 1206), the system executes additional finalizing (1205) and terminates the processing (1207).

If user request is simple finalizing (NO, 1206), then the system terminates the processing (1207).

If the medium has been processed by complete finalizing by judgment (YES, 1201), then the system does nothing about finalizing and terminates the processing (1207).

By applying the above-described finalizing procedure of Embodiment 3, when complete finalizing is requested for the recording medium previously processed by simple finalizing, only additional finalizing (for example, writing data to the lead-out zone) is executed, then the finalizing process can be completed.

Then, further embodiments will be explained in which a video camera and a DVD recorder are configured as information recording/playback apparatus that is integral with the system structure underlying the above-explained Embodiments 1 to 3.

Figure 13:
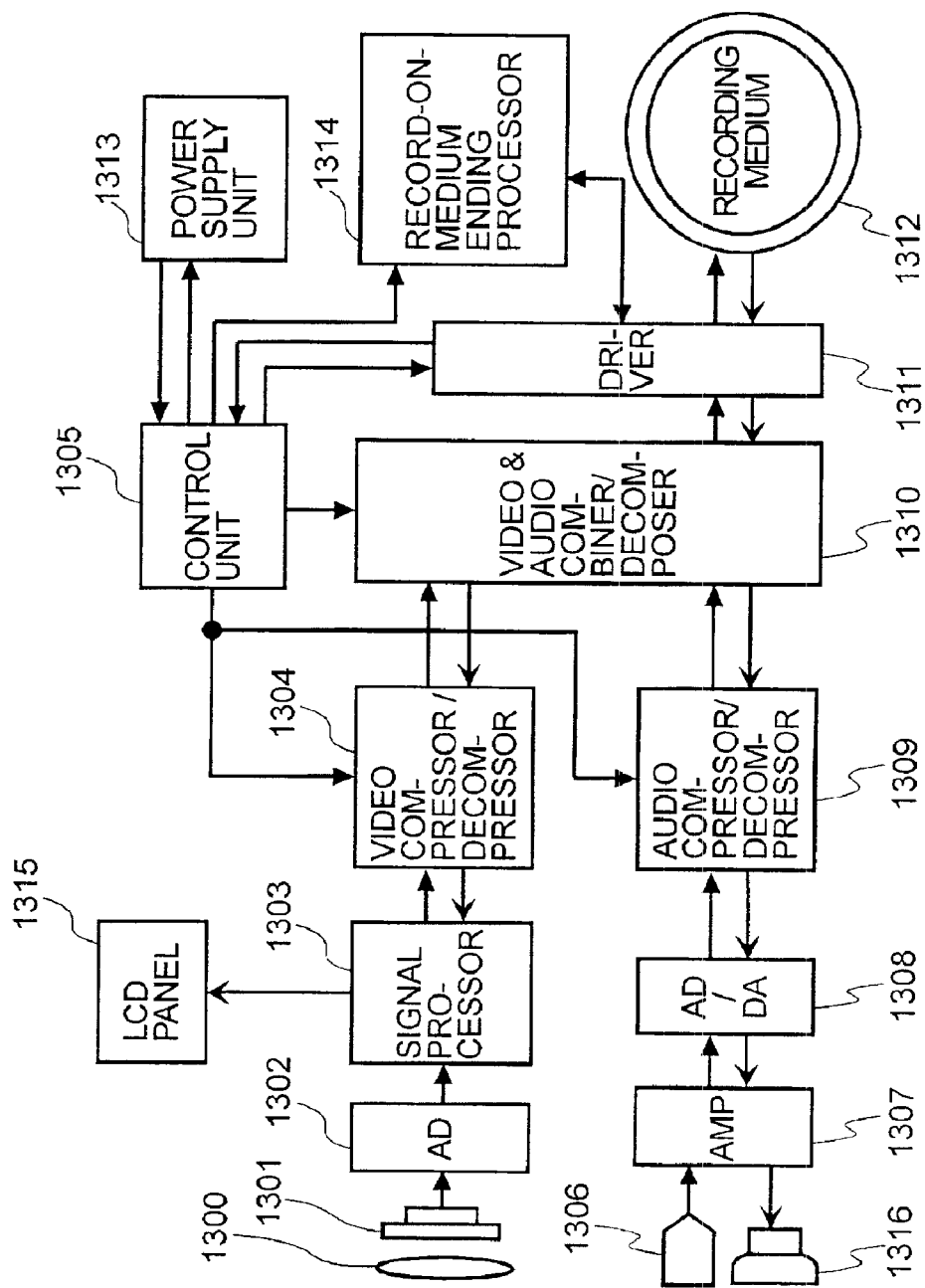
FIG. 13 is a structural diagram illustrative of a video camera capable of recording on both DVD-RAM and DVD-R.

With reference to FIG. 13, a video camera capable of recording on both DVD-RAM and DVD-R optical disks, which is an Embodiment 4, will be first explained.

Refer to FIG. 13, where reference numeral 1300 denotes a lens and 1301 denotes a CCD for converting optical signals received through the lens 1300 to electric signals. Reference numeral 1302 denotes an A/D converter for converting analog electric signals produced through the conversion by the CCD1301 to digital signals. Reference numeral 1303 denotes a signal processor that converts the digital signals output from the A/D converter 1302 to the signals in a format enabling MPEG-compliant compression and performs format conversion to NTSC or the like in replay mode. Reference numeral 1304 denotes a video compressor/ decompressor that performs MPEG-compliant compression of video signals output from the signal processor 1303. The video/compressor decompressor also decompresses compressed signals in replay mode and delivers decompressed signals to the signal processor 1303. Reference numeral 1306 denotes a microphone and 1307 denotes an amplifier (AMP) for amplifying audio signals from the microphone 1306. Reference numeral 1308 denotes an A/D and D/A converter for converting audio signals amplified by the AMP 1307 to digital signals, and vice versa. Reference numeral 1315 denotes an LCD panel such as a liquid crystal monitor and 1316 denotes a speaker.

Moreover, the video camera configuration includes a control unit 1305, driver 1311, recording medium 1312, power supply unit 1313, and record-on-medium ending processor 1314, by which the same processing is performed as described in Embodiments 1 to 3. The video compressor/decompressor 1304 and audio compressor/decompressor 1309 execute the same processing as described for the illustrative system structure shown in FIG. 1, and execute decompression in replay mode. A video and audio combiner/decomposer 1310 executes the same processing for combining video and audio data as described for the illustrative system structure shown in FIG. 1, and moreover decomposes compressed signals put in packets into video and audio signals in replay mode.

Video signals input through the lens 1300 pass through the CCD 1301 and enter the A/D converter 1302 where they are converted to digital signals. The digital video signals produced by the A/D conversion are further converted to the signals in a format enabling MPEG-compliant recording by the signal processor 1303 and these signals are MPEG-compliant compressed by the video compressor/decompressor 1304. The video compressor/decompressor 1304 corresponds to the video compressor 102 in FIG. 1, which also decompresses compressed video data in replay mode. On the other hand, audio signals input through the microphone 1306 are, after amplified by the AMP 1307, converted to digital signals by the A/D and D/A converter 1308. The digital audio signals produced by the A/D conversion are compressed in compliance with the MPEG or Dolby digital standards or the like by the audio compressor/decompressor 1309. The audio compressor/decompressor 1309 corresponds to the audio compressor 104 in FIG. 1, which also decompresses compressed audio data in replay mode. Further processing of compressed video and audio data generated by the video compressor/decompressor 1304 and audio compressor/decompressor 1309 is the same as described for the illustrative system structure shown in FIG. 1.

Then, processing to be carried out in replay mode will be explained with reference to FIG. 13.

When the user issues a replay command, the driver 1311 determines which of DVD-RAM and DVD-R is set on it as the recording medium, reads data from the medium, depending on the medium type, and delivers the thus read data via a buffer or the like to the video and audio combiner/decomposer 1310. Because the thus delivered data is put in packets, the video and audio combiner/decomposer decomposes the received data into video elementary streams which is delivered to the video compressor/decompressor 1304 and audio elementary streams which is delivered to the audio compressor/decompressor 1309. After being decompressed, video signals are converted to those in a format of NTSC or the like by the signal processor 1303 and images are reproduced therefrom and displayed on the LCD panel 1315.

After being decompressed by the audio compressor/decompressor 1309, audio signals are converted to analog audio signals by the A/D and D/A converter 1308 and amplified by the AMP 1307. The amplified audio signals are output through the speaker 1316. During this processing, the video and audio combiner/decomposer 1310 synchronizes the video and audio streams.

For recording operation with the video camera capable of recording on both DVD-RAM and DVD-R optical disks, the time required for finalizing the recording on a DVD-R can be cut by executing simple finalizing in the same manners as described in the foregoing Embodiments. By displaying confirmation messages, the video camera can inform the user of what finalizing will be executed, thereby preventing erroneous finalizing operation. Thus, operability and safety are improved.

In addition to the illustrative confirmation messages provided in the foregoing Embodiments, suitable messages in view of the usage of the video camera (information-recording apparatus integral with a camera), in other words, a portable information-recording apparatus, for example, a message informing the user that the processing time can be cut if you choose simple finalizing that is quicker than complete finalizing should be provided. (For example; "Recording medium cannot be replaced during finalizing execution. Complete finalizing is longer than simple finalizing. Do you really want the system to execute complete finalizing?" or "Quicker simple finalizing is recommended for shots with the camera, so that you can replace the recording medium soon. Do you want the system to execute simple finalizing?" or "If finalizing is aborted by power disruption due to the used up battery, the recording medium may be destroyed. When power is supplied from the battery, quicker simple finalizing is recommended. Do you want the system to execute simple finalizing?")

As described above, by informing the user of what finalizing will be executed before the system starts finalizing, operability is improved as in the case in Embodiment 1. In the following, a video recorder capable of recording on both DVD-RAM and DVD-R optical disks, which is an Embodiment 5, will be explained with reference to FIG. 14. The video recorder mentioned herein is not limited to a portable type that the user can carry for shooting and its range includes a stationary, deck-type recording/playback apparatus.

Figure 14:
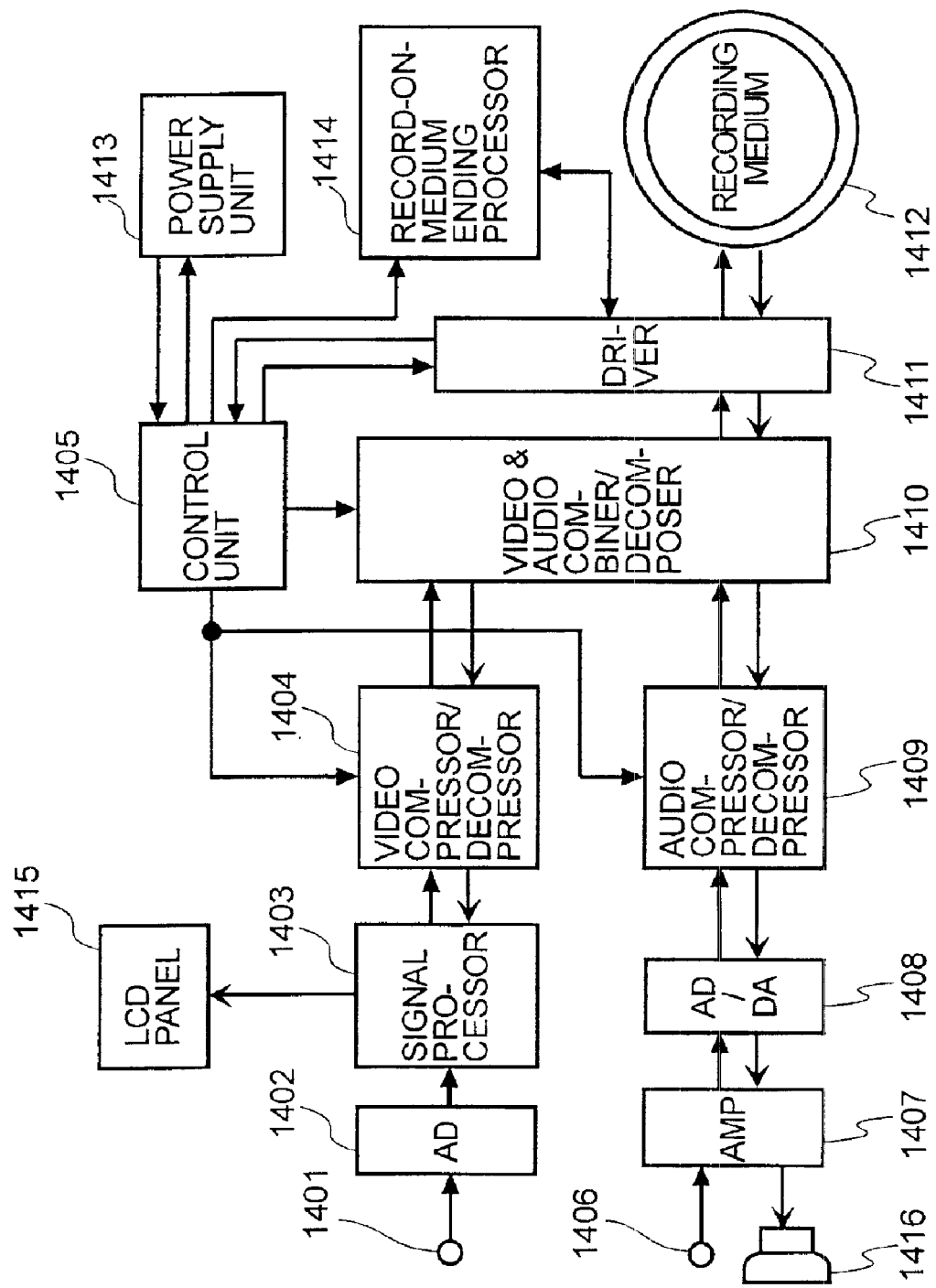
FIG. 14 is a structural diagram illustrative of a video recorder capable of recording on both DVD-RAM and DVD-R.

Refer to FIG. 14, where reference numeral 1401 denotes a video input terminal for line input or the like and 1402 denotes an A/D converter for converting analog electric signals delivered from the video input terminal 1401 to digital signals. Reference numeral 1403 denotes a signal processor that converts the digital signals output from the A/D converter 1402 to the signals in a format enabling MPEG-compliant compression and performs format conversion to NTSC or the like in replay mode. Reference numeral 1404 denotes a video compressor/decompressor that performs MPEG-compliant compression of video signals output from the signal processor 1403.

The video compressor/decompressor 1404 decompresses compressed signals in replay mode and delivers the thus decompressed signals to the signal processor 1403. Reference numeral 1406 denotes an audio input terminal for audio input and 1407 denotes an amplifier (AMP) for amplifying audio signals delivered from the audio input terminal 1406. Reference numeral 1408 denotes an A/D and D/A converter that converts the audio signals amplified by the AMP 1407 to digital signals. Reference numeral 1415 denotes an LCD panel such as a liquid crystal monitor and 1416 denotes a speaker. Moreover, the video recorder configuration includes a control unit 1405, driver 1411, recording medium 1412, power supply unit 1413, and record-on-medium ending processor 1414, by which the same processing is performed as described in Embodiments 1 to 3. The video compressor/decompressor 1404 and audio compressor/decompressor 1409 execute the same processing as described for the illustrative system structure shown in FIG. 1, and execute decompression in replay mode. A video and audio combiner/decomposer 1410 executes the same processing for combining video and audio data as described for the illustrative system structure shown in FIG. 1, and moreover decomposes compressed signals put in packets into video and audio signals in replay mode.

Video signals that are input through the video input terminal 1400 enter the A/D converter 1402 where they are converted to digital signals. The digital video signals produced by the A/D conversion are further converted to the signals in a format enabling MPEG-compliant recording by the signal processor 1403 and these signals are MPEG-compliant compressed by the video compressor/decompressor 1404. The video compressor/decompressor 1404 corresponds to the video compressor 102 in FIG. 1, which also decompresses compressed video data in replay mode. On the other hand, audio signals input through the audio input terminal 1406 are, after amplified by the AMP 1407, converted to digital signals by the A/D and D/A converter 1408. The digital audio signals produced by the A/D conversion are compressed in compliance with the MPEG or Dolby digital standards or the like by the audio compressor/decompressor 1409. The audio compressor/decompressor 1409 corresponds to the audio compressor 104 in FIG. 1, which also decompresses compressed audio data in replay mode. Further processing of compressed video and audio data generated by the video compressor/decompressor 1404 and audio compressor/decompressor 1409 is the same as described for the illustrative system structure shown in FIG. 1.

Then, processing to be carried out in replay mode will be explained with reference to FIG. 14.

When the user issues a replay command, the driver 1411 determines which of DVD-RAM and DVD-R is set on it as the recording medium, reads data from the medium, depending on the medium type, and delivers the thus read data via a buffer or the like to the video and audio combiner/decomposer 1410. Because the thus delivered data is put in packets, the video and audio combiner/decomposer decomposes the received data into video elementary streams which is delivered to the video compressor/decompressor 1404 and audio elementary streams which is delivered to the audio compressor/decompressor 1409. After being decompressed by the video compressor/decompressor 1404, video signals are converted to those in a format of NTSC or the like by the signal processor 1403 and images are reproduced therefrom and displayed on the LCD panel 1415.

After being decompressed by the audio compressor/decompressor 1409, audio signals are converted to analog audio signals by the A/D and D/A converter 1408 and amplified by the AMP 1407. The amplified audio signals are output through the speaker 1416. During this processing, the video and audio combiner/decomposer 1410 synchronizes the video and audio streams.

For recording operation with the video recorder capable of recording on both DVD-RAM and DVD-R optical disks, the time required for finalizing the recording on a DVD-R can be cut by executing simple finalizing in the same manners as described in the foregoing Embodiments. By displaying confirmation messages, the video recorder can inform the user of what finalizing will be executed, thereby preventing erroneous finalizing operation. Thus, operability and safety are improved.

In addition to the illustrative confirmation messages provided in the foregoing Embodiments, suitable messages in view of the usage of the portable or stationary information-recording apparatus, for example, a message informing the user that the processing time can be cut if you choose simple finalizing that is quicker than complete finalizing should be provided. (For example; "Recording medium cannot be replaced during finalizing execution. Complete finalizing is longer than simple finalizing. Do you really want the execution of complete finalizing?" or "If finalizing is aborted by power disruption due to the used up battery, the recording medium may be destroyed. When power is supplied from the battery, quicker simple finalizing is recommended. Do you want the system to execute simple finalizing?")

As described above, by informing the user of what finalizing will be executed before the system starts finalizing, operability is improved as in the case in Embodiment 1.

While the record-on-medium ending process in accordance with embodiments of the present invention was exemplified by the finalizing procedures for a DVD-R disk in the above-described Embodiments, the Embodiments are applicable to other recording media that must be finalized, following recording something thereon; for example, DVD-RW or the like for which the above process is implemented similarly.

While DVD-RAM and DVD-R are exemplary as recording media in the above-described Embodiments, the present invention should be understood to be applied to other rewritable and write-once, read-many recording media, not limited to the above-mentioned disks.

As noted in the foregoing Embodiments, the recording can also be implemented on information-recording apparatus that records signals captured with a video camera (information-recording apparatus integral with a camera) which may be either portable or stationary.

Further advantage of the record-on-medium ending process in accordance with the above-described Embodiments of the present invention will now be explained.

During the record-on-medium ending process that is carried out, following recording on a write-once, read-many recording medium, the medium cannot be removed from the recording apparatus. Thus, the user cannot begin further recording and is let be waiting.

During the ending process, data, which differs, depending on the applied standards of recording, is written to the zones on the medium remaining unfilled with record. The shorter the time of recording information on the medium, the larger will be the area of the zones that remain unfilled with record. The more data must be written to such zones during the ending process and more time is taken, while the user is let be waiting. The longer the ending process time, the longer the user will be let waiting before the user can replace the recording medium by a new one and resume recording.

For portable information-recording apparatus, a battery pack is usually used to supply power to the apparatus. If it takes rather long to complete the record-on-medium ending process as noted above and the battery power is almost used up, there will be a high possibility that finalizing operation may stop in the half-done state due to the lack of power supply from the battery which may occur during that processing. In that event, a recording medium having something recorded thereon is made not replayable by a playback apparatus. However, if the time required for the record-on-medium ending process can be cut as illustrated in the above-described Embodiments, there will be less possibility of finalizing process abortion due to the supply power disruption during that processing. Such trouble can be avoided that, as it happens, a recording medium having something recorded thereon is made not replayable by a playback apparatus.

According to the determination of a power source steady or not in supplying power to the portable information-recording apparatus such as video camera, if AC power is not supplied (instead, for example, a battery pack is supplying power), the simple finalizing is exclusively executed in normal mode. In this case, of course, it is advisable to display a box containing an appropriate message informing the user that simple finalizing will be executed before the start of simple finalizing. Alternatively, it is also advisable that the message box includes select buttons or the like for allowing the user choose between simple finalizing and complete finalizing.

According to the present invention, simple finalizing can be performed, so that the wait time involved by the execution of the record-on-medium ending process can be reduced. Consequently, as an illustration, the user can remove the recording medium, following the completion of its record-on-medium ending process, replace it by a new one, and soon begin recording and shooting with the new one. Thus, the operating facility of video recording apparatus is improved.

Moreover, the invention makes it possible to perform additional finalizing later for a recording medium once processed by simple finalizing, so that the medium can be made replayable by an playback apparatus on which only a completely finalized medium is replayed.

What is claimed is:

1. In an information recording apparatus for recording first information for subsequent playback by a playback apparatus, a method for recording comprising:

receiving said first information;

recording said first information to a user area on a recording medium;

generating second information, said second information not intended for playback by said playback apparatus, said second information comprising playback enabling information and additional information, said playback enabling information being the minimum required information to enable said playback apparatus to playback said first information from said recording medium; and recording said second information on said recording medium;

said recording second information including a first recording mode comprising recording said playback enabling information and recording said additional information on said recording medium;

said recording second information including a second recording mode comprising recording said playback enabling information on said recording medium exclusive of said additional information.

2. The method of claim 1 wherein said recording second information further includes a third recording mode comprising detecting the presence of previously recorded playback enabling information and recording said additional information if previously recorded playback enabling information is detected on said recording medium.

3. The method of claim 1 wherein said first recording mode includes recording said additional information to a boundary zone of said recording medium.

4. The method of claim 1 wherein said playback enabling information is file management information.

5. Apparatus for recording information on a recording medium comprising:

a write head operable to record information onto an area of said recording medium;

a first controller portion operative with said write head and configured to operate said write head to record first information to a user area of said recording medium;

a second controller portion operative with said write head and configured to operate said write head to record second information to an area of said recording medium other than said user area;

a third controller portion operative with said write head and configured to operate said write head to record third information in a boundary zone; and a fourth controller portion operative with said second and third controller portions and configured to select between a first operation of activating said second controller portion exclusive of said third controller portion and a second operation of activating both said second controller portion and said third controller portion;

said second information representative of minimum essential information that enables a playback apparatus to play back said first information;

wherein when said fourth controller portion selects said first operation, said recording medium has contained thereon said second information exclusive of said third information and is able to be played back on said playback device.

6. The apparatus of claim 5 wherein said second information is written to a management information zone.

7. The apparatus of claim 5 wherein said second information is file management information.

8. The apparatus of claim 5 wherein said fourth controller portion is further configured to detect whether said recording medium contains previously recorded second information and if previously recorded second information is detected, then activating said third controller portion exclusive of said second controller portion.

9. The apparatus of claim 5 further including a control circuit comprising a memory, said first controller portion comprising first program code stored in said memory, said second controller portion comprising second program code stored in said memory, said third controller portion comprising third program code stored in said memory.

10. The apparatus of claim 5 further including a user-display portion configured to exchange information with a user to obtain user-input representing whether to select said first operation or said second operation.

11. An information recording apparatus comprising:

a driver for recording information to a recording medium;

a control circuit coupled to said driver to record user-provided information to said recording medium; and a finalizing circuit coupled to said driver to record finalizing information to said recording medium;

said finalizing circuit configured to produce first finalizing information representative of minimum essential information to enable a playback apparatus to play back said user-provided information from said recording medium;

said finalizing circuit further configured to produce second finalizing information suitable for being written to a boundary zone of said recording medium;

said finalizing circuit operable to write said first finalizing information on said recording medium without writing said second finalizing information on said recording medium so that said recording medium can be played back in said playback device having only said first information contained thereon.

12. The apparatus of claim 11 further including a user-display portion configured to exchange information with a user to obtain user-input representing whether to select said first operation or said second operation, said finalizing circuit further operable to detect previously written first finalizing information on said recording medium, said user-display configured to display information indicative of whether said previously written first finalizing information has been detected.

13. The apparatus of claim 11 wherein said first finalizing information is file management information.

14. An information-recording apparatus for recording information on a recording medium from which a playback apparatus can reproduce the information recorded thereon comprising:

means for recording information on said information-recording medium;

means for executing a record-on-medium ending process by which said information-recording medium is processed so as to be replayable by said playback apparatus; and means for controlling said information-recording apparatus;

said means for executing said record-on-medium ending process comprising:

first means for writing minimal information required for said playback apparatus when performing playback processing on said information-recording medium; and second means for writing additional information;

said means for executing said record-on-medium ending process being operable to execute said first means exclusively of said second means, wherein only said minimal information is written on said information-recording medium.

15. The apparatus of claim 14 further including means for detecting previously recorded minimal information and for executing said second means upon detecting previously recorded minimal information.

* * * * *